(12) United States Patent
Dinan

(10) Patent No.: US 11,109,304 B2
(45) Date of Patent: *Aug. 31, 2021

(54) RADIO LINK FAILURE DETECTION OF AN UNLICENSED CELL BY A WIRELESS DEVICE

(71) Applicant: Ofinno, LLC, Reston, VA (US)

(72) Inventor: Esmael Dinan, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/686,368

(22) Filed: Nov. 18, 2019

(65) Prior Publication Data

US 2020/0163000 A1 May 21, 2020

Related U.S. Application Data

(63) Continuation of application No. 15/854,342, filed on Dec. 26, 2017, now Pat. No. 10,484,931.

(Continued)

(51) Int. Cl.
*H04W 48/10* (2009.01)
*H04W 24/08* (2009.01)
(Continued)

(52) U.S. Cl.
CPC ........... *H04W 48/10* (2013.01); *H04W 24/08* (2013.01); *H04W 48/12* (2013.01); *H04W 48/16* (2013.01);
(Continued)

(58) Field of Classification Search
CPC ..... H04W 24/08; H04W 48/06; H04W 48/10; H04W 48/12; H04W 48/16; H04W 72/042; H04W 76/18
See application file for complete search history.

(56) References Cited

U.S. PATENT DOCUMENTS 9,565,605 B1 * 2/2017 Yang ................ H04W 36/06
10,484,931 B2 * 11/2019 Dinan ................ H04W 24/08
(Continued)

OTHER PUBLICATIONS

3GPP TS 36.211 V14.0.0 (Sep. 2016); Technical Specification; 3rd Generation Partnership Project; Technical Specification Group Radio Access Network; Evolved Universal Terrestrial Radio Access (E-UTRA); Physical channels and modulation (Release 14).

(Continued)

*Primary Examiner* — Kashif Siddiqui
(74) *Attorney, Agent, or Firm* — Kavon Nasabzadeh; Philip Smith; Willis Chang

(57) ABSTRACT

A wireless device receives from a first base station, configuration parameters of a plurality of cells. The configuration parameters comprise a first cell group comprising one or more first cells for communication with the first base station, and a second cell group comprising a licensed assisted access (LAA) cell for communication with a second base station. The wireless device receives from the second base station LAA cell signals in a subframe of a plurality of subframes of the LAA cell. The wireless device determines whether the subframe is considered for radio link failure (RLF) detection based on processing the LAA cell signals. The wireless device increments a counter in response to the subframe of the LAA cell being considered for RLF detection, and the wireless device not successfully decoding a control channel in the subframe of the LAA cell. The wireless device detects an RLF based on the counter.

20 Claims, 24 Drawing Sheets

Related U.S. Application Data

(60) Provisional application No. 62/438,678, filed on Dec. 23, 2016.

(51) Int. Cl.
    *H04W 76/18*     (2018.01)
    *H04W 48/12*     (2009.01)
    *H04W 48/16*     (2009.01)
    *H04W 72/04*     (2009.01)
    *H04W 48/06*     (2009.01)

(52) U.S. Cl.
    CPC ............ *H04W 76/18* (2018.02); *H04W 48/06* (2013.01); *H04W 72/042* (2013.01)

(56) References Cited

U.S. PATENT DOCUMENTS

| | | | | |
|---|---|---|---|---|
| 2017/0311189 | A1* | 10/2017 | Almalfouh | H04W 24/08 |
| 2018/0192311 | A1* | 7/2018 | Zeng | H04W 72/04 |
| 2018/0242221 | A1* | 8/2018 | Nagasaka | H04W 48/04 |
| 2019/0045568 | A1* | 2/2019 | Palat | H04W 76/27 |

OTHER PUBLICATIONS

3GPP TS 36.212 V14.0.0 (Sep. 2016); Technical Specification; 3rd Generation Partnership Project; Technical Specification Group Radio Access Network; Evolved Universal Terrestrial Radio Access (E-UTRA); Multiplexing and channel coding (Release 14).
3GPP TS 36.213 V14.0.0 (Sep. 2016); Technical Specification; 3rd Generation Partnership Project; Technical Specification Group Radio Access Network; Evolved Universal Terrestrial Radio Access (E-UTRA); Physical layer procedures (Release 14).
3GPP TS 36.300 V14.0.0 (Sep. 2016); Technical Specification; 3rd Generation Partnership Project; Technical Specification Group Radio Access Network; Evolved Universal Terrestrial Radio Access (E-UTRA); and Evolved Universal Terrestrial Radio Access Network (E-UTRAN);Overall description; Stage 2; (Release 14).
3GPP TS 36.321 V14.0.0 (Sep. 2016); Technical Specification; 3rd Generation Partnership Project; Technical Specification Group Radio Access Network; Evolved Universal Terrestrial Radio Access (E-UTRA); Medium Access Control (MAC) protocol specification (Release 14).
3GPP TS 36.331 V14.0.0 (Sep. 2016); Technical Specification; 3rd Generation Partnership Project; Technical Specification Group Radio Access Network; Evolved Universal Terrestrial Radio Access (E-UTRA); Radio Resource Control (RRC); Protocol specification (Release 14).
R2-166108; 3GPP TSG-RAN WG2 Meeting #95bis; Kaohsiung, Taiwan, Oct. 10-14, 2016; Agenda Item: 9.3.1.4; Source: MediaTek Inc.; Title: RLM and RLF in HF NR.
R2-166533, 3GPP TSG-RAN WG2 Meeting #95bis, Kaohsiung, Taiwan, Oct. 10-14, 2016, Agenda item: 9.3.1.4, Source: Samsung, Title: Radio Link Failure detection in High Frequency NR systems.
R2-166608; 3GPP TSG RAN WG2 Meeting #95bis; Kaohsiung, Oct. 10-14, 2016; Source: ZTE Corporation; Title: RLF analysis on make before break solution.
R2-166878; 3GPP TSG RAN WG2 Meeting #95bis; Kaohsiung, Oct. 10-14, 2016; Agenda item: 9.3.1.4; Source: Intel Corporation; Title: Considerations on radio link failure.
R2-167003; 3GPP TSG-RAN WG2 Meeting #95bis; Kaohsiung, Oct. 10-14, 2016; Source: Huawei, HiSilicon; Title: RLF for NR.
R2-168130; 3GPP TSG-RAN WG2 Meeting #96; Reno, USA, Nov. 14-18, 2016; Agenda Item: 9.3.1.1.3; Source: MediaTek Inc.; Title: RLM and RLF in HF NR.
R2-168326; 3GPP TSG-RAN2 Meeting #96 R2-168326; Reno, US, Nov. 14-18, 2016; Agenda Item: 8.11.3 Mobility enhancements; Source: Ericsson; Title: Fast RLF for NB-IoT.
R2-168517; 3GPP TSG RAN WG2 Meeting #96; Reno, USA, Nov. 14-18, 2016; Agenda item: 9.3.1.1.3; Source: Intel Corporation; Title: Radio link monitoring and radio link failure handling.
R2-168565; 3GPP TSG-RAN WG2 Meeting #96; Reno, Nevada, USA, Nov. 14-18, 2016; Source: Huawei, HiSilicon; Title: RLF for NR.
R2-168722; 3GPP TSG-RAN WG2 Meeting #96; Reno, Nevada, USA, Nov. 14-18, 2016; Agenda Item: 9.3.1.1.3; Source: Ericsson; Title: RLM and RLF in NR.
R2-168822; 3GPP TSG RAN WG2 #96; Reno, USA, Nov. 14-18, 2016; Agenda item: 9.3.1.1.3; Source: Samsung; Title: Radio Link Failure operation in High Frequency NR systems.
RP- 141188; 3GPP TSG RAN Meeting #65; Edinburgh, Scotland, Sep. 9-12, 2014; Source: ZTE; Title: Supporting dual connectivity in LTE-U.
RP-150055; 3GPP; IEEE 802 Interim Session; Atlanta, USA; Jan. 11-16, 2015; Title: 3GPP & unlicensed spectrum.
RP-151725; 3GPP TSG RAN Meeting #70; Sitges, Spain, Dec. 7-10, 2015; Source: ZTE, Xinwei; Title: Supporting dual connectivity in LAA.
RP-151978; 3GPP TSG RAN Meeting #70; Sitges, Spain, Dec. 7-10, 2015 revision of RP-yynnnn; Source: Ericsson, Huawei; Title: New Work Item on enhanced LAA for LTE.
RP-151979; 3GPP TSG RAN Meeting #70; Sitges, Spain, Dec. 7-10, 2015; Title: Motivation for Enhanced Licensed Assisted Access for LTE in Rel-14.
RP-160926; 3GPP TSG RAN Meeting #72; Busan, Korea, Jun. 13-17, 2016; Source: ZTE; Title: Discussion on further enhancement of LAA for LTE.
RP-161036; 3GPP TSG RAN Meeting #72;Busan, Korea, Mar. 13-16, 2016; Title: Motivation for New Work Item for Enhancing Utilization of CA for LTE.
RP-161150; 3GPP TSG RAN Meeting #72; Busan, Korea, Jun. 13-16, 2016; Source: Qualcomm Incorporated; Title: New WI proposal on LTE standalone and dual connectivity operation in unlicensed spectrum.
RP-161701; 3GPP TSG RAN Meeting #73; New Orleans, Sep. 19-22, 2016; Source: ZTE; Title: New WI proposal Further enhancement on FeLAA.
RP-161702; 3GPP TSG RAN Meeting #73; New Orleans, USA, Sep. 19-22, 2016; Title: Motivation for new WI Further enhancement on FeLAA.

* cited by examiner

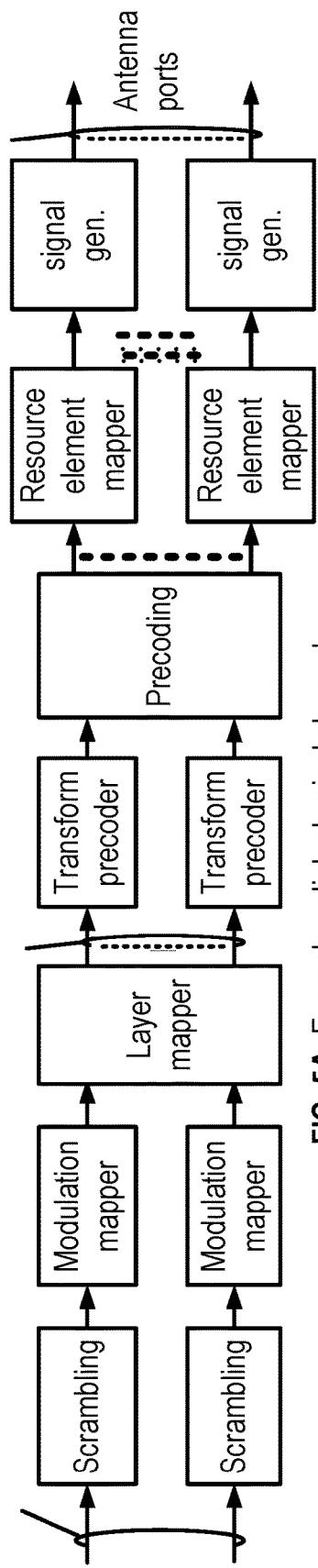
FIG. 5A Example uplink physical channel
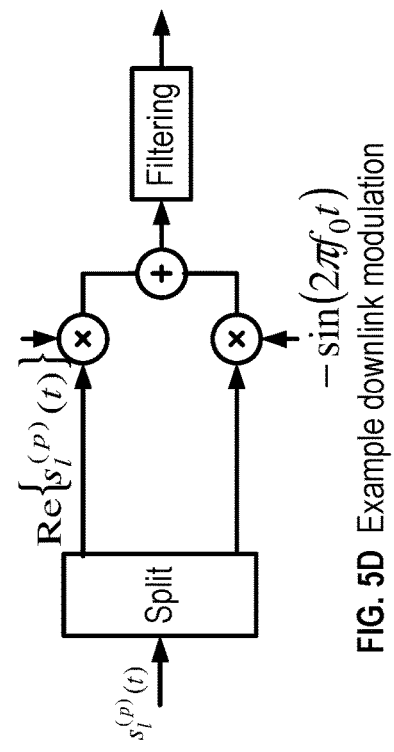
FIG. 5B Example uplink modulation
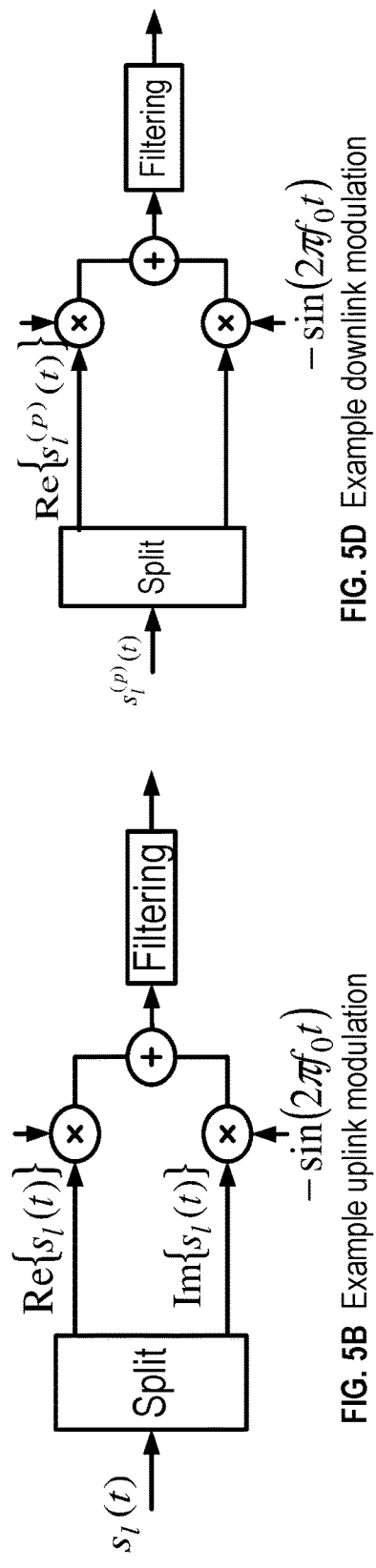
FIG. 5D Example downlink modulation
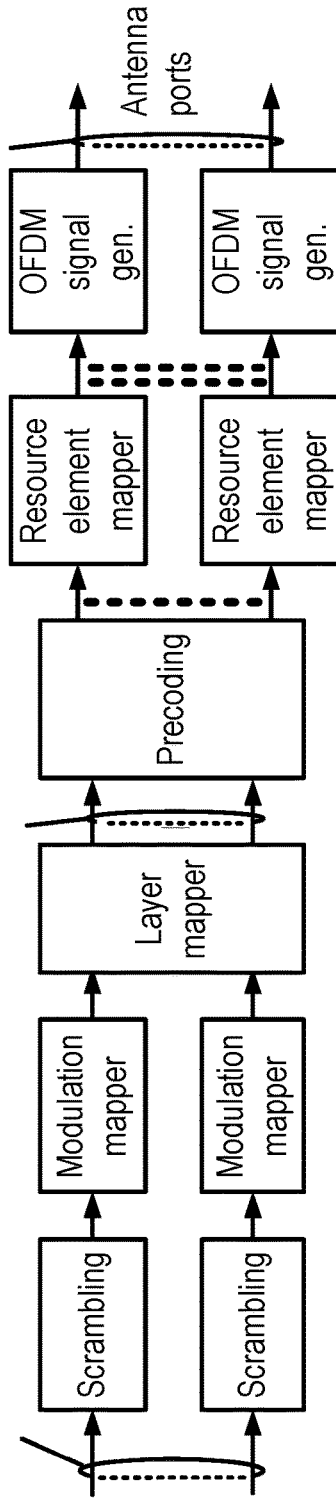
FIG. 5C Example downlink physical channel FIG. 7 Dual-Connectivity- two MAC entities at UE side

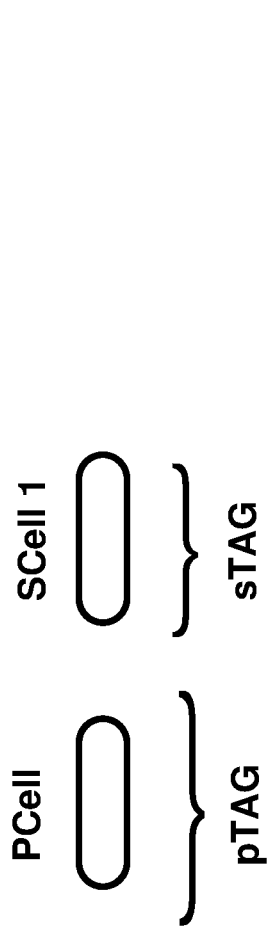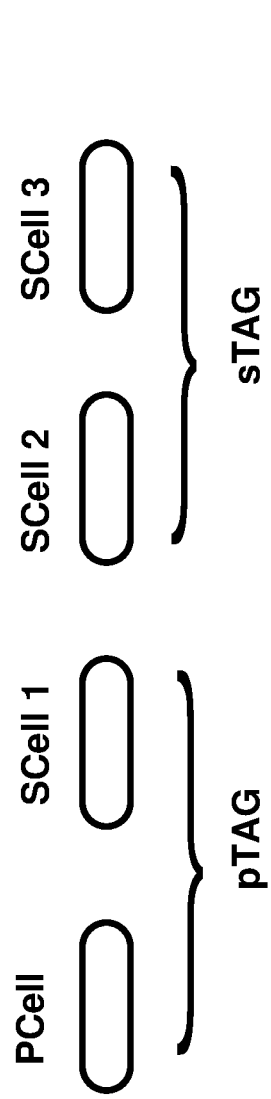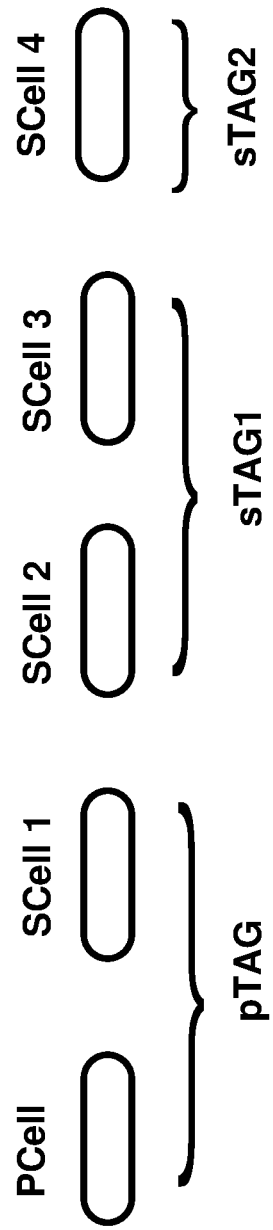
FIG. 8

| DRX cycle length (s) | $T_{Evaluate\_Q_{out\_DRX}}$ and $T_{Evaluate\_Q_{in\_DRX}}$ (s) (DRX cycles) |
|---|---|
| ≤ 0.01 | Non-DRX requirements in are applicable. |
| 0.01 < DRX cycle ≤ 0.04 | Note 1 (20) |
| 0.04 < DRX cycle ≤ 0.64 | Note 1 (10) |
| 0.64 < DRX cycle ≤ 2.56 | Note 1 (5) |

Note 1: Evaluation period length in time depends on the length of the DRX cycle in use
Note 2: MCG's DRX configuration is applied for PCell RLM evaluation and SCG's DRX configuration is applied for PSCell RLM evaluation

FIG. 14

| DRX cycle length (s) | $T_{Evaluate\_Q_{out\_DRX}}$ and $T_{Evaluate\_Q_{in\_DRX}}$ (s) (DRX cycles) |
|---|---|
| ≤ 0.01 | Non-DRX requirements in are applicable. |
| 0.01 < DRX cycle ≤ 0.04 | Note 1 (40) |
| 0.04 < DRX cycle ≤ 0.16 | Note 1 (20) |
| 0.16 < DRX cycle ≤ 0.64 | Note 1 (10) |
| 0.64 < DRX cycle ≤ 2.56 | Note 1 (5) |
| Note 1: Evaluation period length in time depends on the length of the DRX cycle in use
Note 2: MCG's DRX configuration is applied for PCell RLM evaluation and SCG's DRX configuration is applied for PSCell RLM evaluation | |

FIG. 15

| eDRX_CONN cycle length [s] | $T_{Evaluate\_Q_{out\_DRX}}$ and $T_{Evaluate\_Q_{in\_DRX}}$ [s] (eDRX_CONN cycles) |
|---|---|
| 2.56 < eDRX_CONN cycle ≤ 10.24 | Note (5) |

Note: Evaluation period length in time may depend on the length of the eDRX_CONN cycle in use

FIG. 16

RADIO LINK FAILURE DETECTION OF AN UNLICENSED CELL BY A WIRELESS DEVICE

CROSS-REFERENCE TO RELATED APPLICATIONS

This application is a continuation of U.S. patent application Ser. No. 15/854,342 filed Dec. 26, 2017, which claims the benefit of U.S. Provisional Application No. 62/438,678, filed Dec. 23, 2016 which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

FIG. 14 shows example radio link evaluation parameters as per an aspect of an embodiment of the present disclosure.

FIG. 15 shows example radio link evaluation parameters as per an aspect of an embodiment of the present disclosure.

FIG. 16 shows example radio link evaluation parameters as per an aspect of an embodiment of the present disclosure.

DETAILED DESCRIPTION OF EMBODIMENTS

Figure 1:
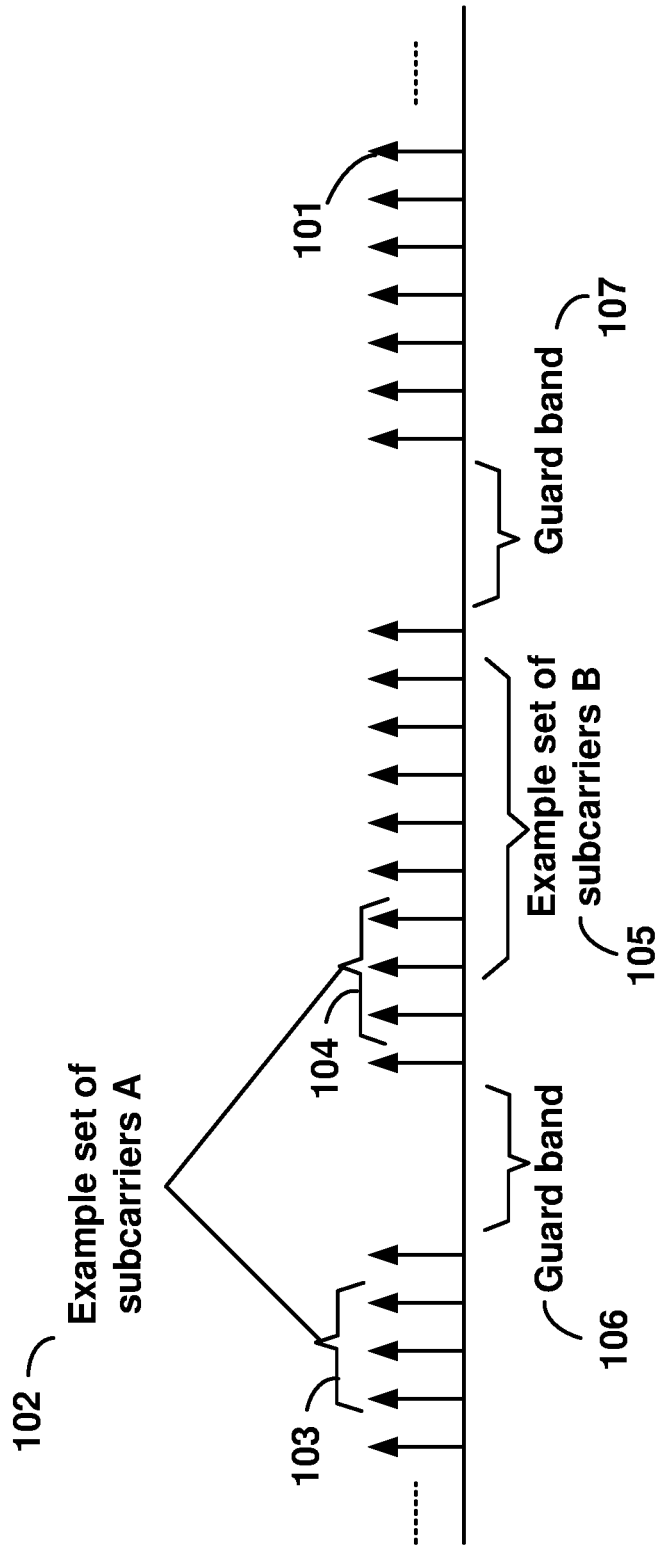
FIG. 1 is a diagram depicting example sets of OFDM subcarriers as per an aspect of an embodiment of the present disclosure.

Example embodiments of the present disclosure enable operation of carrier aggregation. Embodiments of the technology disclosed herein may be employed in the technical field of multicarrier communication systems.

The following Acronyms are used throughout the present disclosure:
ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LAA licensed assisted access
LTE long term evolution
MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying RBG Resource Block Groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TB transport block
UL uplink
UE user equipment
VHDL VHSIC hardware description language Example embodiments of the disclosure may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
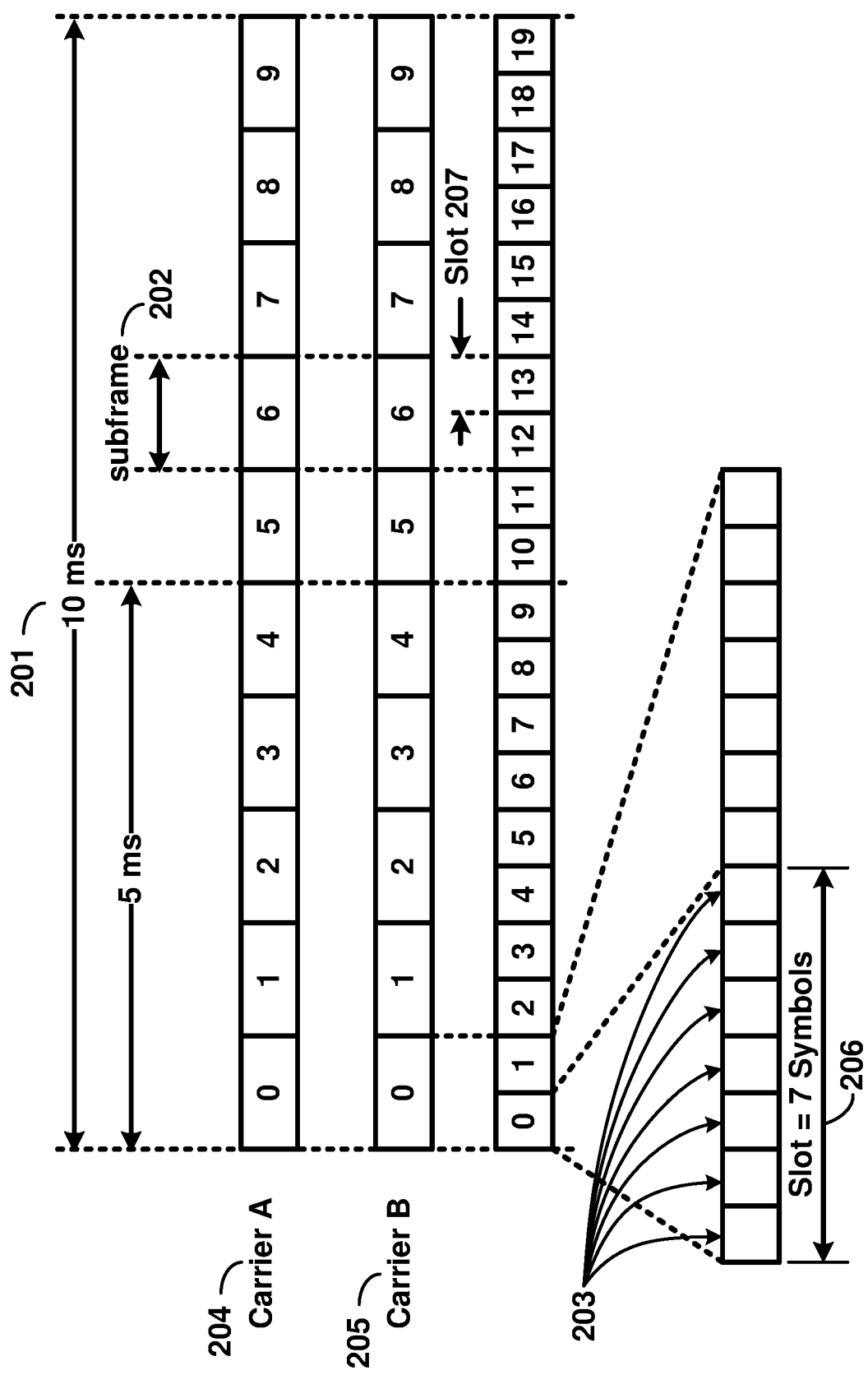
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, the radio frame duration is 10 msec. Other frame durations, for example, in the range of 1 to 100 msec may also be supported. In this example, each 10 ms radio frame 201 may be divided into ten equally sized subframes 202. Other subframe durations such as 0.5 msec, 1 msec, 2 msec, and 5 msec may also be supported. Subframe(s) may consist of two or more slots (for example, slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
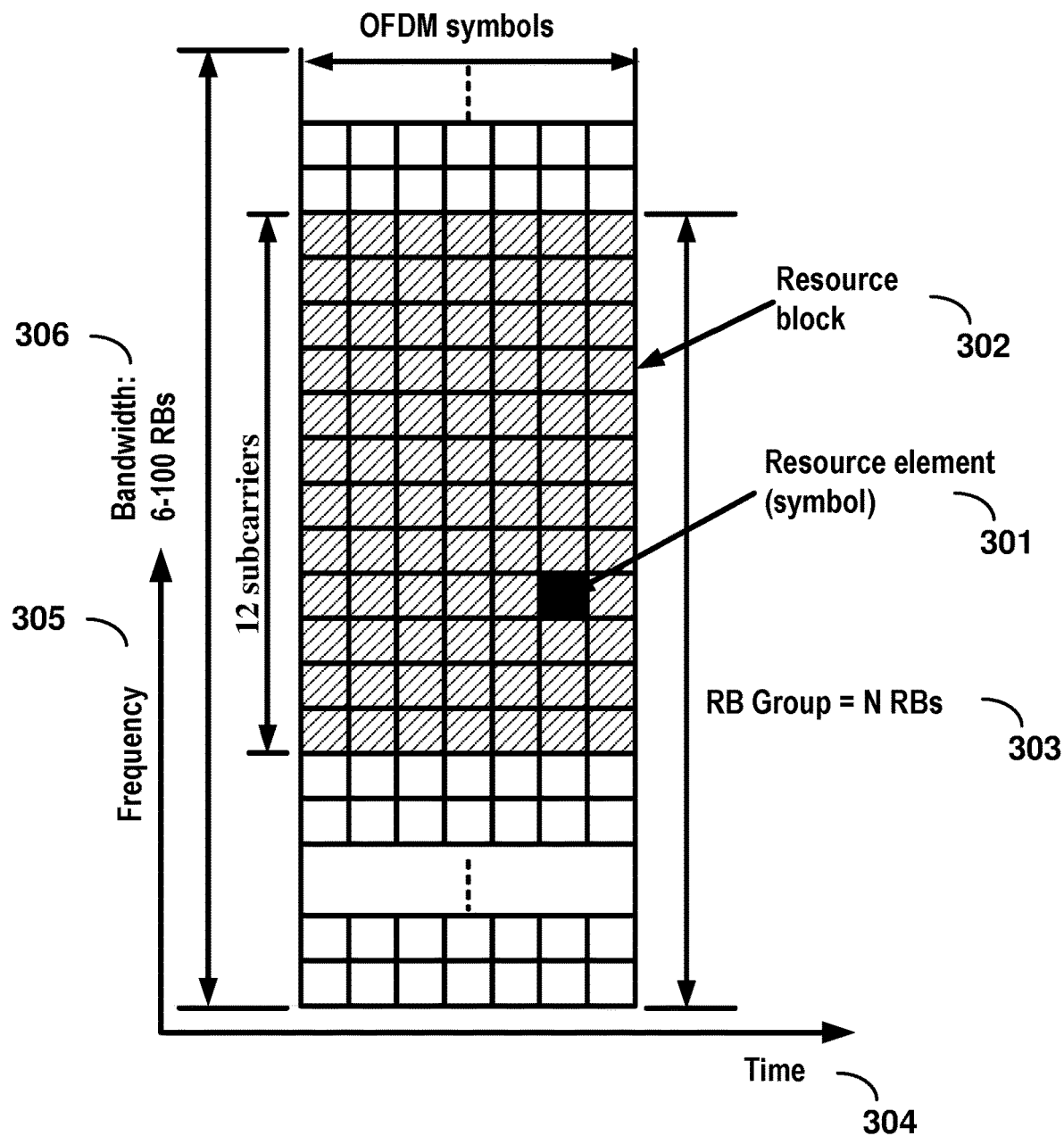
FIG. 3 is an example diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
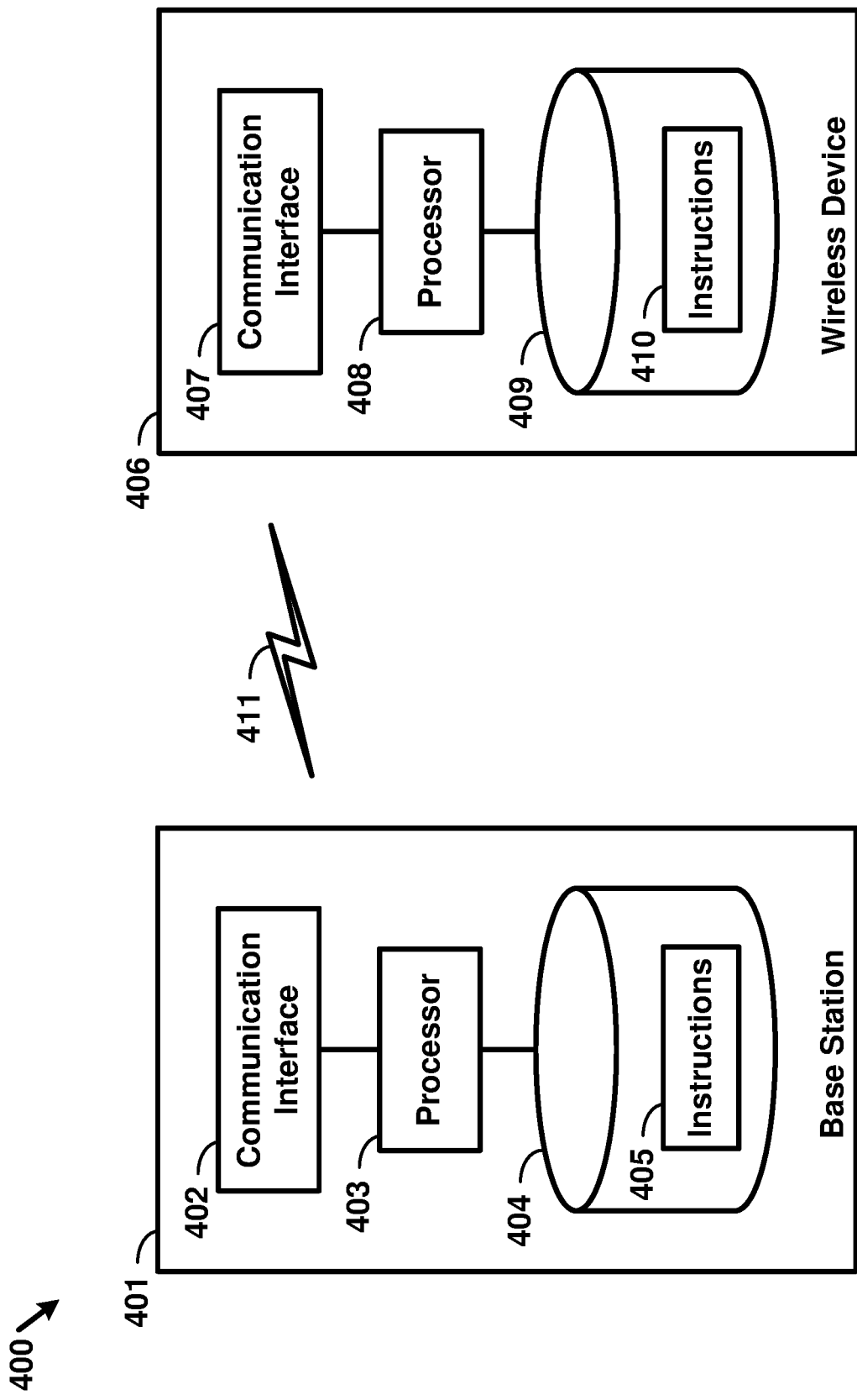
FIG. 4 is an example block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to aspects of an embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to various aspects of an embodiment, an LTE network may include a multitude of base stations, providing a user plane PDCP/RLC/MAC/PHY and control plane (RRC) protocol terminations towards the wireless device. The base station(s) may be interconnected with other base station(s) (for example, interconnected employing an X2 interface). Base stations may also be connected employing, for example, an S1 interface to an EPC. For example, base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply, for example, to carrier activation. When the specification indicates that a first carrier is activated, the specification may also mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
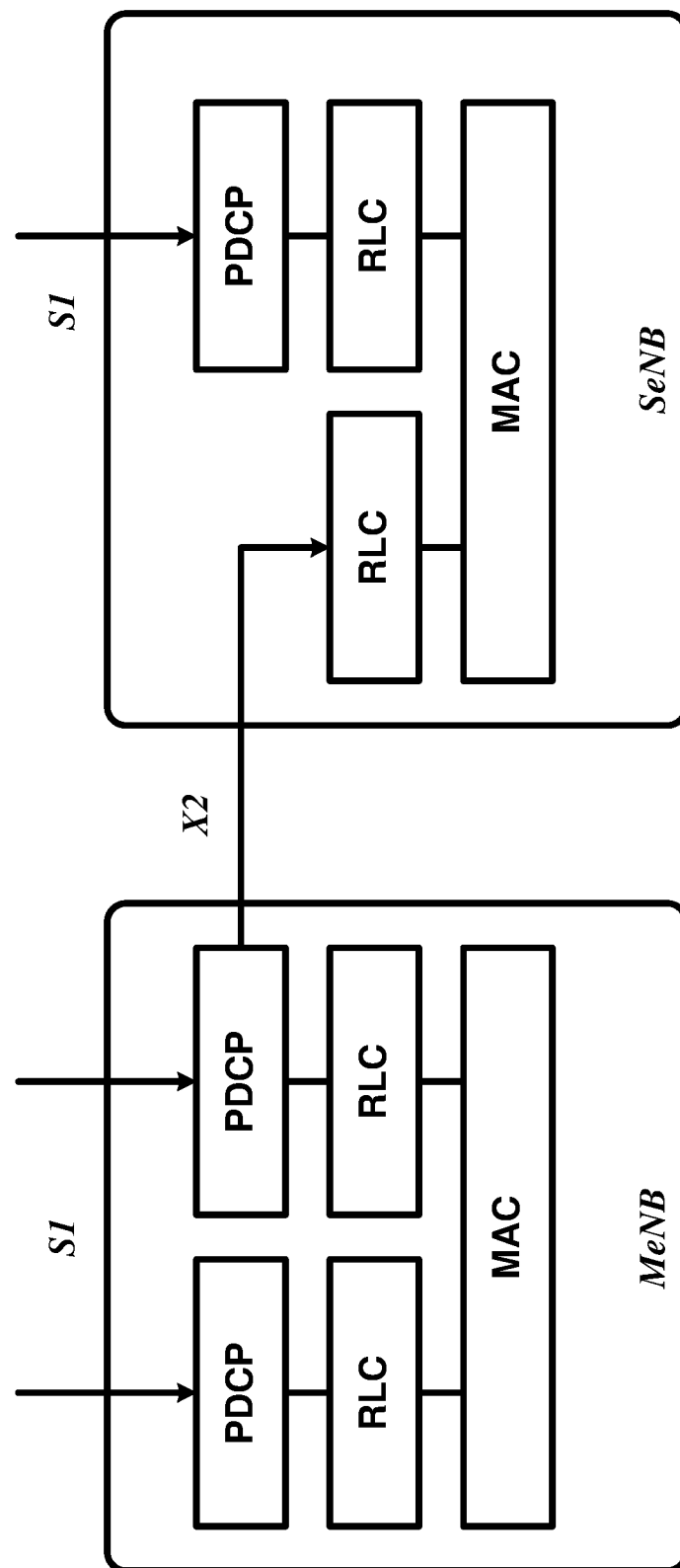
FIG. 6 is an example diagram for a protocol structure with CA and DC as per an aspect of an embodiment of the present disclosure.
Figure 7:
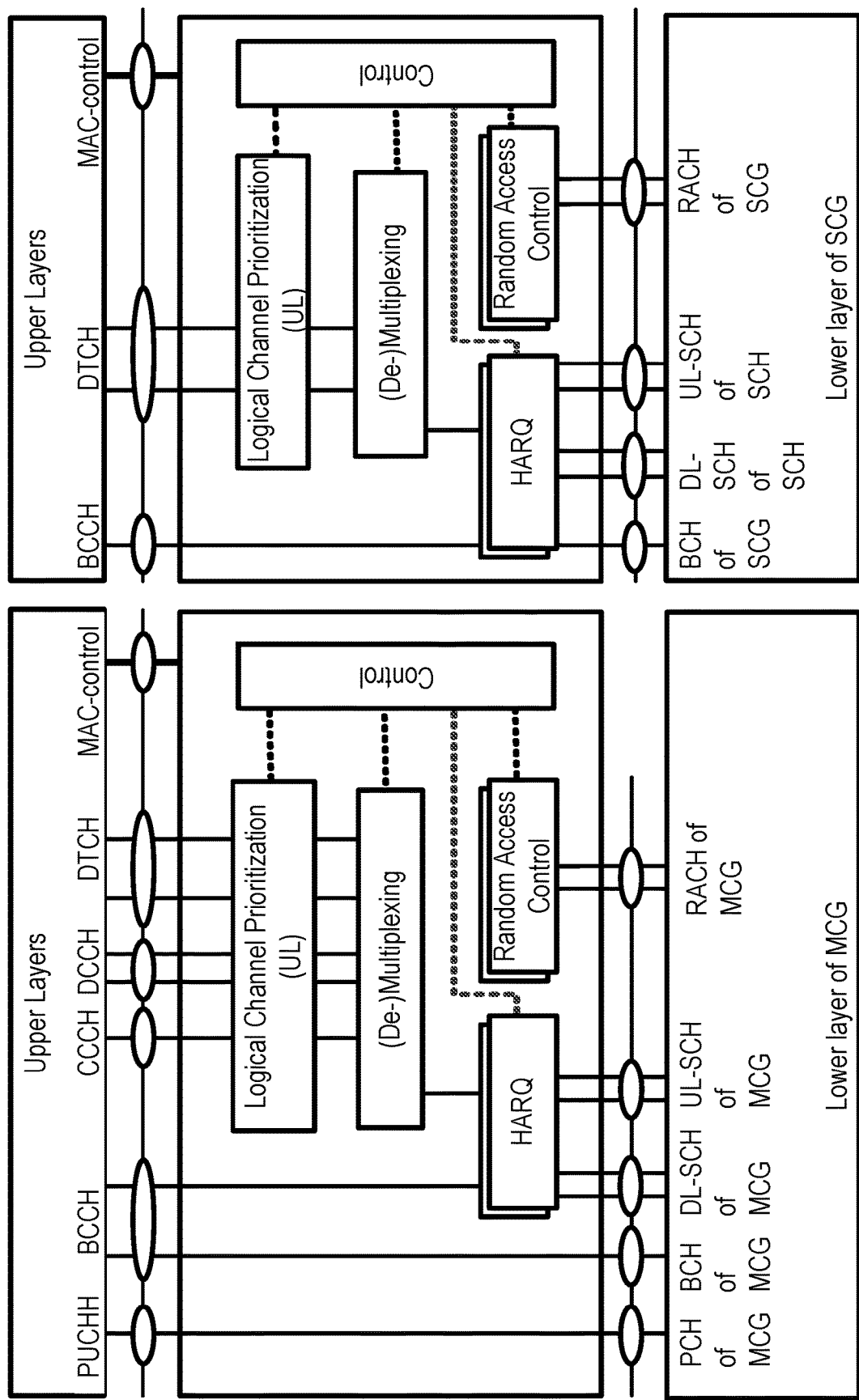
FIG. 7 is an example diagram for a protocol structure with CA and DC as per an aspect of an embodiment of the present disclosure.

FIG. 6 and FIG. 7 are example diagrams for protocol structure with CA and DC as per an aspect of an embodiment of the present disclosure. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the disclosure.

In the case of DC, the UE may be configured with two MAC entities: one MAC entity for MeNB, and one MAC entity for SeNB. In DC, the configured set of serving cells for a UE may comprise two subsets: the Master Cell Group (MCG) containing the serving cells of the MeNB, and the Secondary Cell Group (SCG) containing the serving cells of the SeNB. For a SCG, one or more of the following may be applied. At least one cell in the SCG may have a configured UL CC and one of them, named PSCell (or PCell of SCG, or sometimes called PCell), may be configured with PUCCH resources. When the SCG is configured, there may be at least one SCG bearer or one Split bearer. Upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG may be stopped, and a MeNB may be informed by the UE of a SCG failure type. For split bearer, the DL data transfer over the MeNB may be maintained. The RLC AM bearer may be configured for the split bearer. Like a PCell, a PSCell may not be de-activated. A PSCell may be changed with a SCG change (for example, with a security key change and a RACH procedure), and/or neither a direct bearer type change between a Split bearer and a SCG bearer nor simultaneous configuration of a SCG and a Split bearer may be supported.

With respect to the interaction between a MeNB and a SeNB, one or more of the following principles may be applied. The MeNB may maintain the RRM measurement configuration of the UE and may, (for example, based on received measurement reports or traffic conditions or bearer types), decide to ask a SeNB to provide additional resources (serving cells) for a UE. Upon receiving a request from the MeNB, a SeNB may create a container that may result in the configuration of additional serving cells for the UE (or decide that it has no resource available to do so). For UE capability coordination, the MeNB may provide (part of) the AS configuration and the UE capabilities to the SeNB. The MeNB and the SeNB may exchange information about a UE configuration by employing RRC containers (inter-node messages) carried in X2 messages. The SeNB may initiate a reconfiguration of its existing serving cells (for example, a PUCCH towards the SeNB). The SeNB may decide which cell is the PSCell within the SCG. The MeNB may not change the content of the RRC configuration provided by the SeNB. In the case of a SCG addition and a SCG SCell addition, the MeNB may provide the latest measurement results for the SCG cell(s). Both a MeNB and a SeNB may know the SFN and subframe offset of each other by OAM, (for example, for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises a PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
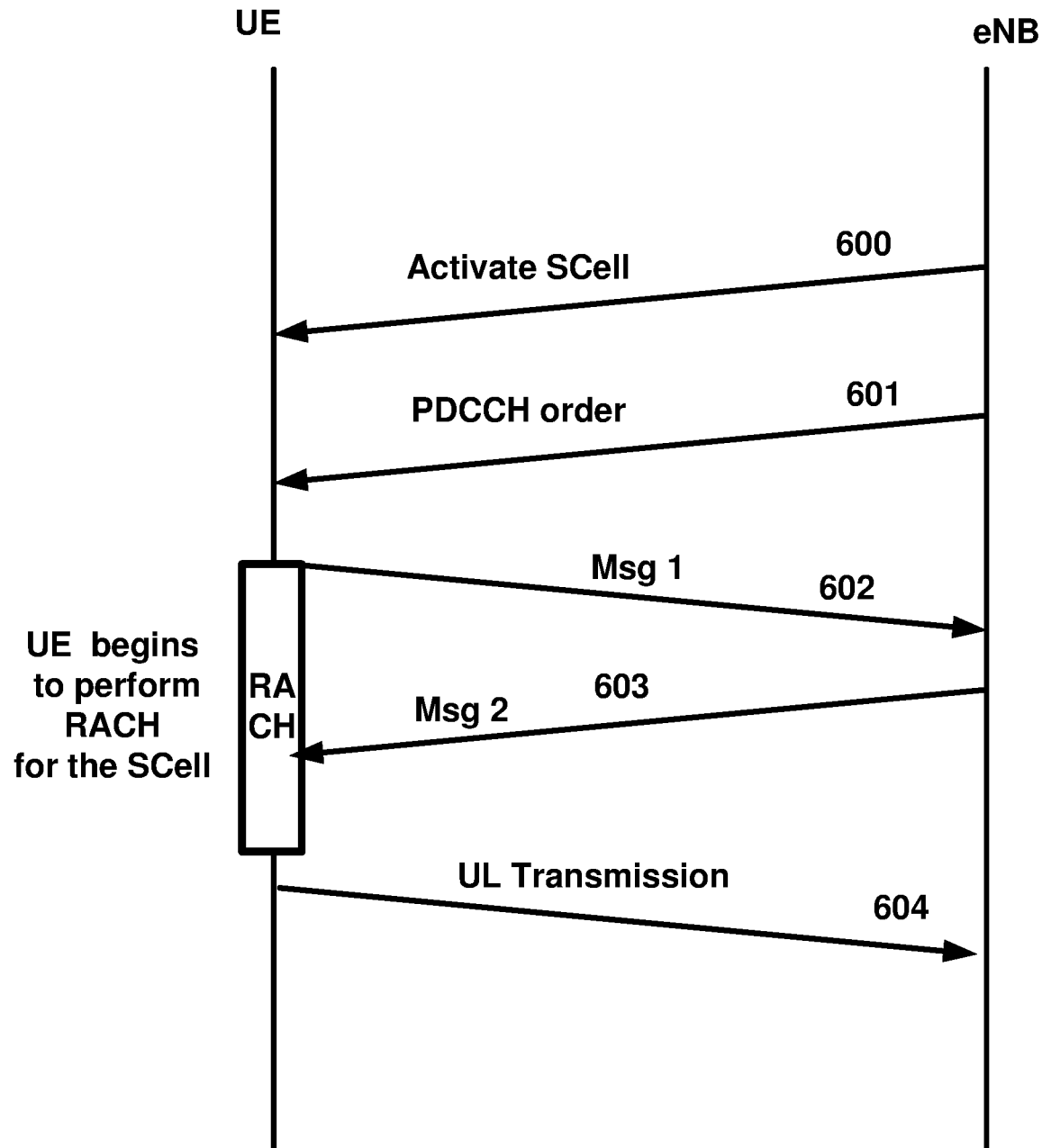
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to an embodiment, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to various aspects of an embodiment, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, (for example, at least one RRC reconfiguration message), may be send to the UE to reconfigure TAG configurations by releasing the SCell and then configuring the SCell as a part of the pTAG. When an SCell is added/configured without a TAG index, the SCell may be explicitly assigned to the pTAG. The PCell may not change its TA group and may be a member of the pTAG.

The purpose of an RRC connection reconfiguration procedure may be to modify an RRC connection, (for example, to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH may only be transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command In example embodiments, a timer is running once it is started, until it is stopped or until it expires; otherwise it may not be running A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

The amount of data traffic carried over cellular networks is expected to increase for many years to come. The number of users/devices is increasing and each user/device accesses an increasing number and variety of services, e.g. video delivery, large files, images. This may require not only high capacity in the network, but also provisioning very high data rates to meet customers' expectations on interactivity and responsiveness. More spectrum may therefore be needed for cellular operators to meet the increasing demand Considering user expectations of high data rates along with seamless mobility, it may be beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, may be an effective complement to licensed spectrum for cellular operators to help addressing the traffic explosion in some scenarios, such as hotspot areas. LAA may offer an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs, time & frequency synchronization of UEs, and/or the like.

In an example embodiment, a DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

An LBT procedure may be employed for fair and friendly coexistence of LAA with other operators and technologies operating in an unlicensed spectrum. LBT procedures on a node attempting to transmit on a carrier in an unlicensed spectrum may require the node to perform a clear channel assessment to determine if the channel is free for use. An LBT procedure may involve at least energy detection to determine if the channel is being used. For example, regulatory requirements in some regions, for example, in Europe, may specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold. For example, LAA may employ a mechanism to adaptively lower the energy detection threshold from an upper bound. Adaptation mechanism(s) may not preclude static or semi-static setting of the threshold. In an example a Category 4 LBT mechanism or other type of LBT mechanisms may be implemented.

Various example LBT mechanisms may be implemented. In an example, for some signals, in some implementation scenarios, in some situations, and/or in some frequencies, no LBT procedure may performed by the transmitting entity. In an example, Category 2 (for example, LBT without random back-off) may be implemented. The duration of time that the channel is sensed to be idle before the transmitting entity transmits may be deterministic. In an example, Category 3 (for example, LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (for example, LBT with random back-off with a contention window of variable size) may be implemented. The transmitting entity may draw a random number N within a contention window. The size of the contention window may be specified by a minimum and maximum value of N. The transmitting entity may vary the size of the contention window when drawing the random number N. The random number N may be employed in the LBT procedure to determine the duration of time that the channel is sensed to be idle before the transmitting entity transmits on the channel.

LAA may employ uplink LBT at the UE. The UL LBT scheme may be different from the DL LBT scheme (for example, by using different LBT mechanisms or parameters), since the LAA UL may be based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. A UL transmission burst from a UE perspective may be a continuous transmission from a UE with no transmission immediately before or after from the same UE on the same CC. In an example, a UL transmission burst may be defined from a UE perspective. In an example, a UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

Figure 10:
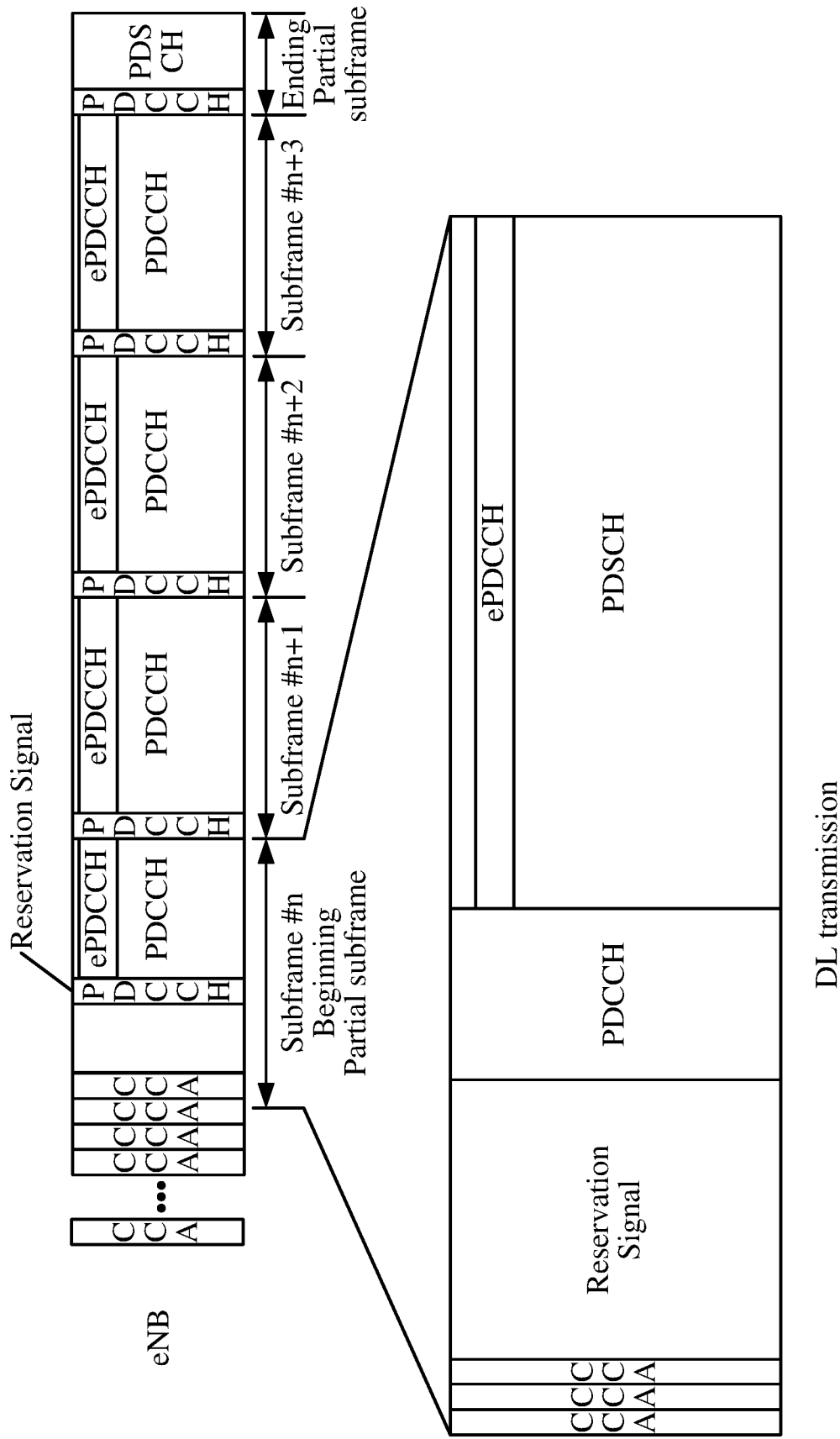
FIG. 10 is an example diagram depicting a downlink burst as per an aspect of an embodiment of the present disclosure.

In an example embodiment, in an unlicensed cell, a downlink burst may be started in a subframe. When an eNB accesses the channel, the eNB may transmit for a duration of one or more subframes. The duration may depend on a maximum configured burst duration in an eNB, the data available for transmission, and/or eNB scheduling algorithm. FIG. 10 shows an example downlink burst in an unlicensed (e.g. licensed assisted access) cell. The maximum configured burst duration in the example embodiment may be configured in the eNB. An eNB may transmit the maximum configured burst duration to a UE employing an RRC configuration message.

The wireless device may receive from a base station at least one message (for example, an RRC) comprising configuration parameters of a plurality of cells. The plurality of cells may comprise at least one cell of a first type (e.g. license cell) and at least one cell of a second type (e.g. unlicensed cell, an LAA cell). The configuration parameters of a cell may, for example, comprise configuration parameters for physical channels, (for example, a ePDCCH, PDSCH, PUSCH, PUCCH and/or the like). The wireless device may determine transmission powers for one or more uplink channels. The wireless device may transmit uplink signals via at least one uplink channel based on the determined transmission powers.

In an example embodiment, LTE transmission time may include frames, and a frame may include many subframes. The size of various time domain fields in the time domain may be expressed as a number of time units $T_s=1/(15000\times 2048)$ seconds. Downlink, uplink and sidelink transmissions may be organized into radio frames with $T_f=307200\times T_s=10$ ms duration.

In an example LTE implementation, at least three radio frame structures may be supported: Type 1, applicable to FDD, Type 2, applicable to TDD, Type 3, applicable to LAA secondary cell operation. LAA secondary cell operation applies to frame structure type 3.

Transmissions in multiple cells may be aggregated where one or more secondary cells may be used in addition to the primary cell. In case of multi-cell aggregation, different frame structures may be used in the different serving cells.

Frame structure type 1 may be applicable to both full duplex and half duplex FDD. A radio frame is $T_f=307200\cdot T_s=10$ ms long and may comprise 20 slots of length $T_{slot}=15360\cdot T_s=0.5$ ms, numbered from 0 to 19. A subframe i may include two consecutive slots where subframe i comprises of slots 2i and 2i+1.

For FDD, 10 subframes are available for downlink transmission and 10 subframes are available for uplink transmissions in a 10 ms interval. Uplink and downlink transmissions are separated in the frequency domain. In half-duplex FDD operation, the UE may not transmit and receive at the same time while there may not be such restrictions in full-duplex FDD.

Frame structure type 2 may be applicable to TDD. A radio frame of length $T_f=307200\cdot T_s=10$ ms may comprise of two half-frames of length $153600\cdot T_s=5$ ms. A half-frame may comprise five subframes of length $30720\cdot T_s=1$ ms. A subframe i may comprise two slots, 2i and 2i+1, of length $T_{slot}=15360\cdot T_s=0.5$ ms.

The uplink-downlink configuration in a cell may vary between frames and controls in which subframes uplink or downlink transmissions may take place in the current frame. The uplink-downlink configuration in the current frame is obtained via control signaling.

An example subframe in a radio frame, "may be a downlink subframe reserved for downlink transmissions, may be an uplink subframe reserved for uplink transmissions or may be a special subframe with the three fields DwPTS, GP and UpPTS. The length of DwPTS and UpPTS are subject to the total length of DwPTS, GP and UpPTS being equal to $30720\cdot T_s=1$ ms.

Uplink-downlink configurations with both 5 ms and 10 ms downlink-to-uplink switch-point periodicity may be supported. In case of 5 ms downlink-to-uplink switch-point periodicity, the special subframe may exist in both half-frames. In case of 10 ms downlink-to-uplink switch-point periodicity, the special subframe may exist in the first half-frame.

Subframes 0 and 5 and DwPTS may be reserved for downlink transmission. UpPTS and the subframe immediately following the special subframe may be reserved for uplink transmission.

In an example, in case multiple cells are aggregated, the UE may assume that the guard period of the special subframe in the cells using frame structure Type 2 have an overlap of at least $1456\cdot T_s$.

In an example, in case multiple cells with different uplink-downlink configurations in the current radio frame are aggregated and the UE is not capable of simultaneous reception and transmission in the aggregated cells, the following constraints may apply, if the subframe in the primary cell is a downlink subframe, the UE may not transmit any signal or channel on a secondary cell in the same subframe. If the subframe in the primary cell is an uplink subframe, the UE may not be expected to receive any downlink transmissions on a secondary cell in the same subframe. If the subframe in the primary cell is a special subframe and the same subframe in a secondary cell is a downlink subframe, the UE may not be expected to receive PDSCH/EPDCCH/PMCH/PRS transmissions in the secondary cell in the same subframe, and the UE may not be expected to receive any other signals on the secondary cell in OFDM symbols that overlaps with the guard period or UpPTS in the primary cell.

Frame structure type 3 may be applicable to LAA secondary cell operation with normal cyclic prefix. A radio frame is $T_f=307200T_s=10$ ms long and comprises of 20 slots of length $T_{slot}=15360\cdot T_s=0.5$ ms, numbered from 0 to 19. A subframe may comprise as two consecutive slots where subframe i comprises slots 2i and 2i+1.

The 10 subframes within a radio frame are available for downlink transmissions. Downlink transmissions occupy one or more consecutive subframes, starting anywhere within a subframe and ending with the last subframe either fully occupied or following one of the DwPTS durations. Subframes may be available for uplink transmission when LAA uplink is supported.

Some example embodiments may be implemented in stand-alone unlicensed operation when a UE communications with an eNB via a plurality of unlicensed cells. Some example embodiments may be implemented in dual-connectivity configuration when a UE is connected to two eNBs via a plurality of licensed and/or unlicensed cells.

In an example, when configured with dual connectivity (DC), a UE may be simultaneously connected to two eNBs: e.g., a master eNB (MeNB) and a secondary eNB (SeNB). The MeNB and SeNB may be connected via an X2 interface.

In an example, E-UTRAN may support Dual Connectivity (DC) operation. A UE in RRC_CONNECTED equipped with multiple Rx/Tx may be configured to utilize radio resources provided by two distinct schedulers, located in two eNBs connected via a non-ideal backhaul over the X2 interface. The overall E-UTRAN architecture may be applicable for DC as well. eNBs involved in DC for a certain UE may assume two different roles: an eNB may either act as an MeNB or as an SeNB. In DC a UE may be connected to one MeNB and one SeNB.

Figure 11:
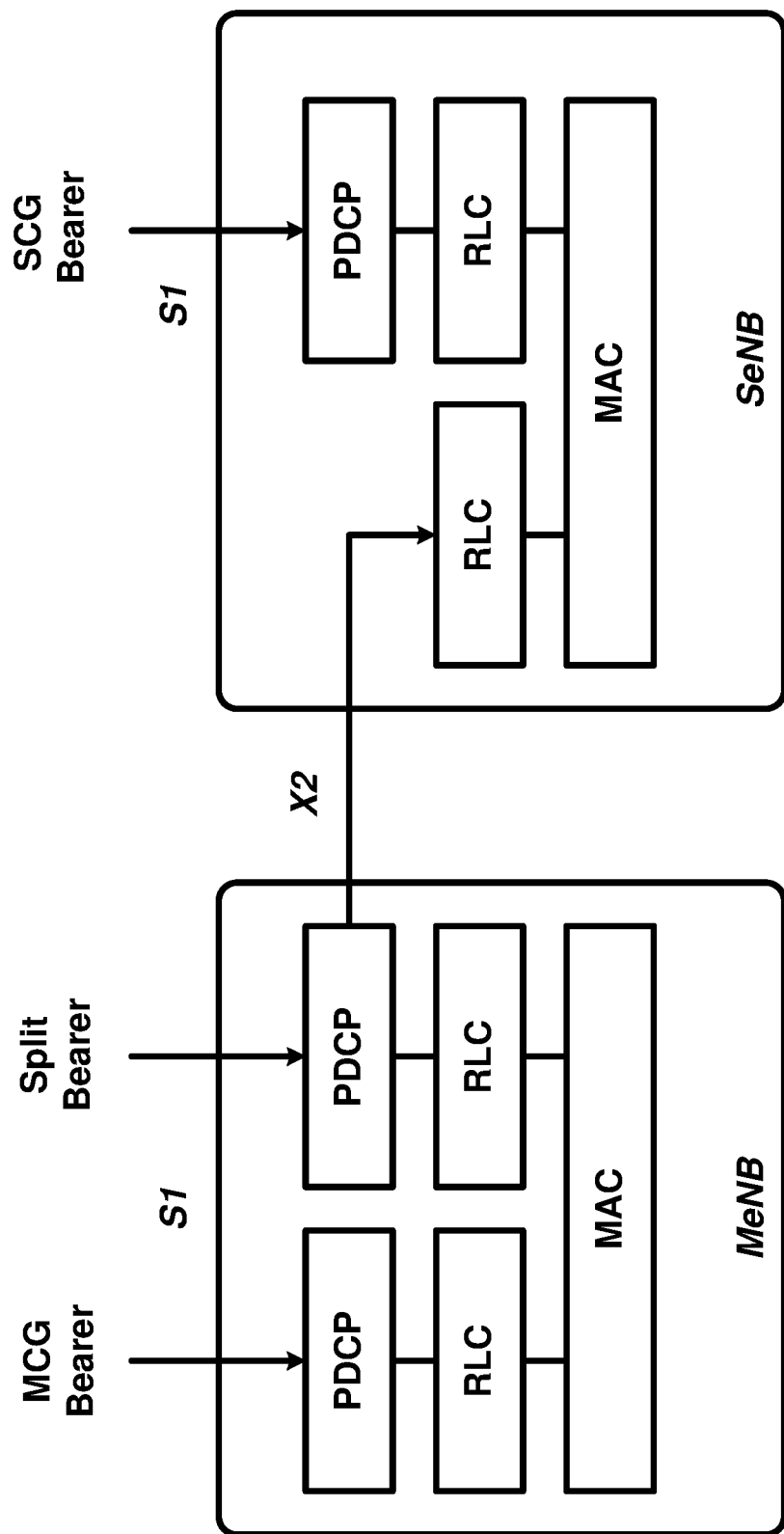
FIG. 11 is an example dual connectivity architecture with different bearer types as per an aspect of an embodiment of the present disclosure.

In an example, in DC, the radio protocol architecture that a particular bearer uses may depend on how the bearer is setup. In an example, three bearer types may exist: MCG bearer, SCG bearer and split bearer. Example bearer types are shown in FIG. 11. In an example, RRC may be located in MeNB and SRBs may be configured as MCG bearer type. In an example, SRBs may use the radio resources of the MeNB. In an example, at least one bearer may be configured to use radio resources provided by the SeNB.

In an example, inter-eNB control plane signalling for DC may be performed by means of X2 interface signalling. Control plane signalling towards the MME may be performed by means of S1 interface signalling. In an example, there may be one S1-MME connection per DC UE between the MeNB and the MME. An eNB may handle UEs independently, e.g., provide the PCell to some UEs while providing SCell(s) for SCG to others. An eNB involved in DC for a certain UE may control its radio resources and may be primarily responsible for allocating radio resources of its cells. Respective coordination between MeNB and SeNB may be performed by means of X2 interface signalling.

In an example, for dual connectivity two different user plane architectures may be allowed. In an example first architecture, the S1-U may terminate in the MeNB and the user plane data may be transferred from MeNB to SeNB, e.g., using the X2-U. In an example, second architecture, the S1-U may terminate in the SeNB.

In an example, different bearer options may be configured with different user plane architectures. U-plane connectivity may depend on the bearer option configured. In an example, for MCG bearers, the S1-U connection for the corresponding bearer(s) to the S-GW may be terminated in the MeNB. The SeNB may not be involved in the transport of user plane data for this type of bearer(s) over the Uu. In an example, for split bearers, the S1-U connection to the S-GW may be terminated in the MeNB. PDCP data may be transferred between the MeNB and the SeNB via X2-U. The SeNB and MeNB may be involved in transmitting data of this bearer type over the Uu. In an example, for SCG bearers, the SeNB may be directly connected with the S-GW via S1-U. The MeNB may not be involved in the transport of user plane data for this type of bearer(s) over the Uu. In an example, if only MCG and split bearers are configured, there may be no S1-U termination in the SeNB.

In an example, wireless device and/or base station may perform physical layer measurements in uplink and/or downlink. In an example, two basic measurement quantities may be supported by the wireless device, e.g., reference signal received power (RSRP) and reference signal received quality (RSRQ). In an example, the RSRP measurements may be based on one or more signals comprising cell-specific reference signals or CSI reference signals for example in configured discovery signals. In an example, RSRP may be a linear average power of reference signal across channel bandwidth.

In an example, a physical control format indicator channel (PCFICH) may inform a UE about the number of symbols used for the physical downlink control channel (PDCCH). In an example, PCFICH may indicate the number of symbols for other control channels such as physical HARQ indicator channel (PHICH). The PCFICH may be transmitted in every downlink or special subframe. In an example, PCFICH may be mapped to the first symbol in a downlink subframe. A UE may decode PCFICH to determine how many symbols are assigned for a control channel (e.g., PDCCH). In an example, a UE may determine resources used for transmission of PCFICH based on cell ID and bandwidth.

In an example, the PCFICH may indicate the instantaneous size of the control region in terms of the number of OFDM symbols. In an example, PCFICH may indirectly indicate where in the subframe the data region starts. Correct decoding of the PCFICH information may be essential. If the PCFICH is incorrectly decoded, the device may neither know how to process the control channels nor where the data region starts for the corresponding subframe. The PCFICH may consist of two bits of information, corresponding to the three control-region sizes of one, two, or three OFDM symbols (two, three, or four for narrow bandwidths), which are coded into a 32-bit codeword. The coded bits are scrambled with a cell- and subframe-specific scrambling code to randomize inter-cell interference, QPSK modulated, and mapped to 16 resource elements. As the size of the control region is unknown until the PCFICH is decoded, the PCFICH may be mapped to the first OFDM symbol of each subframe.

In an example, the mapping of the PCFICH to resource elements in the first OFDM symbol in the subframe may be done in groups of four resource elements, with the four groups being well separated in frequency to obtain good diversity. In an example, to avoid collisions between PCFICH transmissions in neighboring cells, the location of the four groups in the frequency domain may depend on the physical-layer cell identity.

The wireless device may detect a radio link failure on a cell (e.g. SPCell) based on a successful or unsuccessful decoding of the PDCCHs transmitted on the cell. The radio link failure detection process may employ one or more counters and/or one or more timers and may be based on successful or unsuccessful decoding of PDCCH over subframes on the cell. In an example, on LAA cells, the base station my not transmit one or more LAA signals for example due to an LBT procedure indicating that the channel is occupied. In an example, the one or more signals may comprise PCFICH signals. In an example, the one or more signals may comprise one or more reference signals (e.g., cell-specific reference signals, etc.). In an example, the wireless device may determine that the PCFICH is not transmitted on a cell (e.g., LAA cell) and the wireless device may not receive control channels. The wireless device may not decode or attempt to decode (successfully or unsuccessfully) the control channel (e.g., PDCCH) as the wireless device does not know the number of symbols on which the PDCCH is transmitted. An action by the wireless device before decoding the PDCCH may be decoding of the PCFICH. If the wireless device considers PDCCH decoding on a subframe that the base station does not transmit the PDCCH (e.g., due to LBT in downlink) as unsuccessful, the wireless device may frequently report radio link failure even if uplink channel conditions are good. There is a need to enhance the radio link failure detection process to avoid unnecessary radio link failure reporting of the wireless device caused by the base station being held back to transmit control channels e.g., PCFICH/PDCCH in a subframe for example due to unsuccessful LBT in downlink. Example embodiments enhance the radio link failure detection process at the wireless device.

Some example embodiments may be implemented in stand-alone unlicensed operation when a UE communicates with an eNB via a plurality of unlicensed cells. Some example embodiments may be implemented in dual-connectivity configuration when a UE is connected to two or more eNBs via a plurality of licensed and/or unlicensed cells.

In an example, when configured with dual connectivity (DC), a UE may be connected to two eNBs: e.g., a master eNB (MeNB) and a secondary eNB (SeNB). The MeNB and SeNB may be connected via an X2 interface.

In an example, E-UTRAN may support Dual Connectivity (DC) operation whereby a multiple Rx/Tx UE in RRC_CONNECTED may be configured to utilize radio resources provided by two schedulers, located in two eNBs connected via a backhaul over the X2 interface. An E-UTRAN architecture may be applicable for DC. In an example, eNBs involved in DC for a UE may assume two different roles: an eNB may either act as an MeNB or as an SeNB. In DC, a UE may be connected to one MeNB and one SeNB.

In an example, in DC, the radio protocol architecture that a bearer uses may depend on how the bearer is setup. Three bearer types may exist: MCG bearer, SCG bearer and split bearer. Example three bearer types are depicted in FIG. 11. In an example, RRC may be located in MeNB and signaling radio bearers (SRBs) may be configured as MCG bearer type and may use the radio resources of the MeNB.

In an example, in a radio access network, unlicensed component carriers may be used as Licensed Assisted Access (LAA) cells in dual connectivity configuration on Secondary eNBs (SeNB) together with licensed cells on SeNB and MeNB or they may be deployed as standalone cells. In an example SeNB may be configured with both licensed and LAA cells. In an example SeNB may be configured with LAA cells.

In an example, when SeNB is deployed and configured with both licensed and LAA carriers, the SPCells may be configured with licensed cells. In an example, SPCell may be configured on a licensed or LAA cell.

For LAA cells channel availability for downlink and uplink transmission may be subject to regulatory requirements such as maximum channel occupancy and listen before talk. In an example, when network is highly loaded, the LAA carrier which may be configured as SPCell may experience long periods of unavailability and that may result in infrequent transmission of downlink reference signals, such as discovery reference signals. Some of subframes in an LAA or unlicensed cells may be used dynamically for uplink transmission. Such non-periodic and sporadic transmission reference signal transmission need to be considered in radio link monitoring and radio link failure detection.

In an example, the timer T310 may be started, for example, upon detecting physical layer problems for the PCell, e.g., upon receiving N310 consecutive out-of-sync indications from lower layers. In an example, the timer T310 may be stopped, for example, upon receiving N311 consecutive in-sync indications from lower layers for the PCell, upon triggering the handover procedure and upon initiating the connection re-establishment procedure. In an example at the expiry of the T310, if security is not activated, the wireless device may go to RRC_IDLE, otherwise, the wireless device may initiate the connection re-establishment procedure.

In an example, the timer T311 may be started, for example, upon initiating the RRC connection re-establishment procedure. The timer T311 may be stopped, for example, upon selection of a suitable cell or a cell using another RAT. In an example, at the expiry of T311, the wireless device may enter RRC_IDLE state.

In an example, the timer T312 may be started, for example, upon triggering a measurement report for a measurement identity for which T312 has been configured, while T310 is running. In an example, the timer T312 may be stopped upon receiving N311 consecutive in-sync indications from lower layers, upon triggering the handover procedure, upon initiating the connection re-establishment procedure, or upon the expiry of T310. In an example, at the expiry of T312 timer, if security is not activated, the wireless device may go to RRC_IDLE. Otherwise, the wireless device may initiate the connection re-establishment procedure.

In an example, the timer T313 may be started, for example, upon detecting physical layer problems for the PSCell, e.g., upon receiving N313 consecutive out-of-sync indications from lower layers. In an example, the timer T313 may be stopped, for example, upon receiving N314 consecutive in-sync indications from lower layers for the PSCell, upon initiating the connection re-establishment procedure, upon SCG release or upon receiving RRCConnectionReconfiguration including MobilityControlInfoSCG. In an example, at the expiry of the T313 timer, the wireless device may inform the network about the SCG radio link failure by initiating the SCG failure information procedure.

In an example, upon T310 expiry or upon T312 expiry or upon T312 expiry or upon random access problem indication from MCG MAC while neither T300, T301, T304 nor T311 is running or upon indication from MCG RLC that the maximum number of retransmissions has been reached for an SRB or for an MCG or split DRB, the wireless device may consider radio link failure to be detected for the MCG (e.g., RLF).

In an example, the wireless device may store the following radio link failure information in the VarRLF-Report. The wireless device may clear the information included in VarRLF-Report, if any. The wireless device may set the plmn-IdentityList to include the list of EPLMNs stored by the UE (e.g., includes the RPLMN). The wireless device may set the measResultLastServCell to include the RSRP and RSRQ, if available, of the PCell based on measurements collected up to the moment the UE detected radio link failure.

In an example, the wireless device may set the measResultNeighCells to include the best measured cells, other than the PCell, ordered such that the best cell is listed first, and based on measurements collected up to the moment the UE detected radio link failure. In an example, the wireless device may set the fields of measResultNeighCells as follows: if the UE was configured to perform measurements for one or more EUTRA frequencies, the wireless device may include the measResultListEUTRA. In an example, if the UE was configured to perform measurement reporting for one or more neighbouring UTRA frequencies, include the measResultListUTRA. In an example, if the UE was configured to perform measurement reporting for one or more neighbouring GERAN frequencies, include the measResultListGERAN. In an example, if the UE was configured to perform measurement reporting for one or more neighbouring CDMA2000 frequencies, include the measResultsCDMA2000. In an example, for each neighbour cell included, the wireless device may include the optional fields that are available. In an example, the measured quantities may be filtered by the L3 filter as configured in the mobility measurement configuration. The measurements may be based on the time domain measurement resource restriction, if configured. Blacklisted cells may not be required to be reported. The wireless device may set the connectionFailureType to rlf; set the c-RNTI to the C-RNTI used in the PCell; and set the rlf-Cause to the trigger for detecting radio link failure.

In an example, upon T313 expiry or upon random access problem indication from SCG MAC or upon indication from SCG RLC that the maximum number of retransmissions has been reached for an SCG or split DRB, the wireless device may consider radio link failure to be detected for the SCG, e.g., SCG-RLF. The wireless device may initiate the SCG failure information procedure to report SCG radio link failure. In an example, the UE may discard the radio link failure information, e.g., release the UE variable VarRLF-Report, 48 hours after the radio link failure is detected, upon power off or upon detach.

Figure 12:
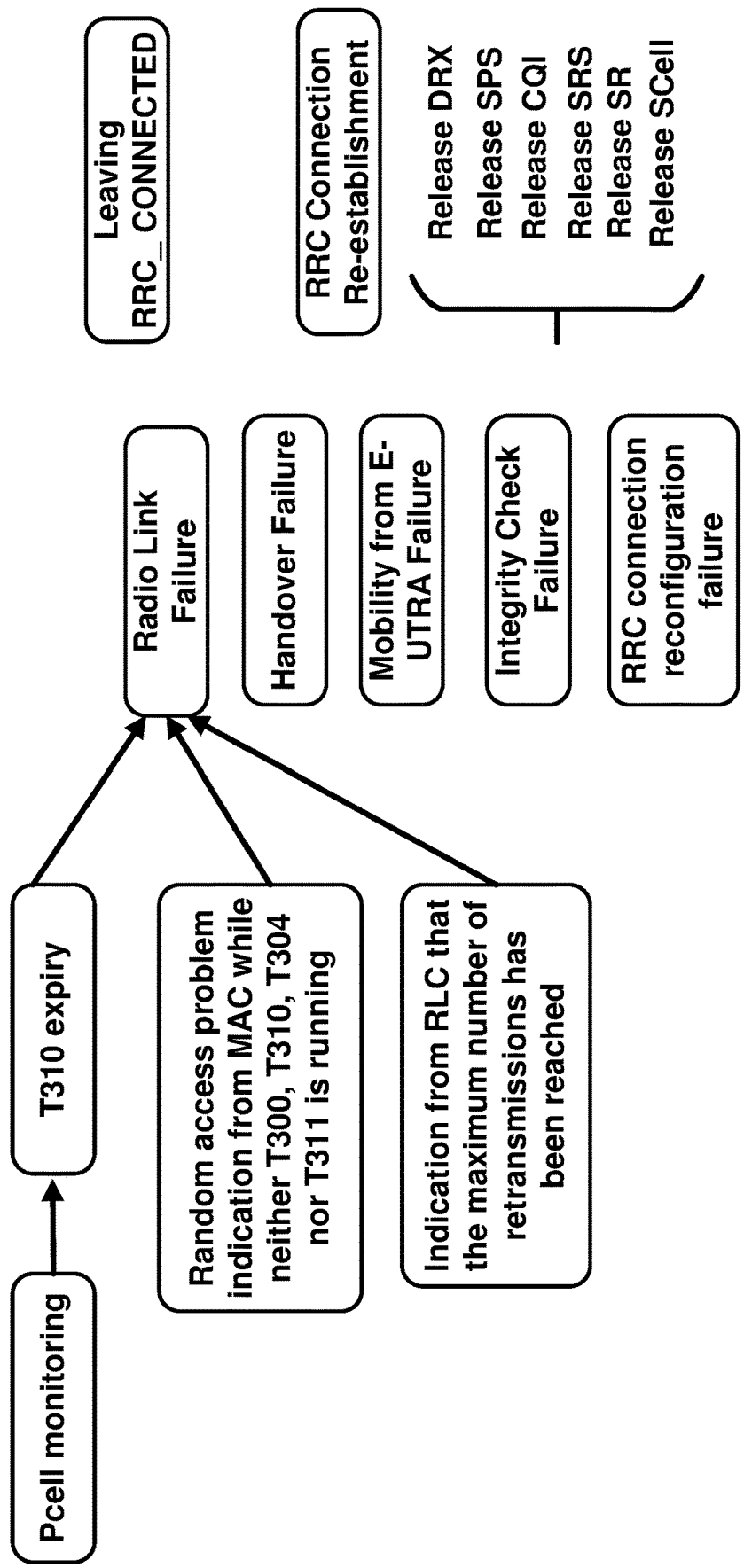
FIG. 12 is an example radio link monitoring flow diagram as per an aspect of an embodiment of the present disclosure.

In an example, RLM may be used to keep track of the radio link condition so that appropriate steps may be taken if Radio Link Failure (RLF) is declared. FIG. 12 shows an example RLM process. In an example, implementation of some of the blocks may be optional.

In an example, PCell radio link monitoring may determine whether the PCell radio link may be considered as failed (e.g. radio link is worse than $Q_{out}$ for time period determined by N310). If so, a UE may perform two at least one of the following actions; 1) stopping autonomous uplink transmission by releasing SPS, CQI, SRS, SR and 2) starting cell selection procedure to find a cell providing acceptable radio link. The detailed detection implementation may be up to UE implementation and eNodeB implementation.

In an example, a UE may assume that Radio Link is failed for example because: The measured RSRP is low (under a certain limit); The UE failed to decode PDCCH due to power signal quality (e.g., low RSRP, RSRQ; under a certain limit); The UE failed to decode PDSCH due to power signal quality (e.g., low RSRP, RSRQ; under a certain limit). In some cases, example issues may consecutively happen for a certain period and a one or more timers and parameters may be employed for configuring the RLF criteria.

The UE may be expected to monitor one or more reference signals (RS) in the downlink. Based on the signal strength of the Reference Signals (e.g., the RSRP), the UE may determine if the UE may decode the PDCCH based on a predefine set of parameters. A UE may have a different RSRP threshold in which it may assume it cannot decode the PDCCH. If the Reference signals have enough strength such that the UE may decode the PDCCH, then the link may be in-Sync.

Figure 13:
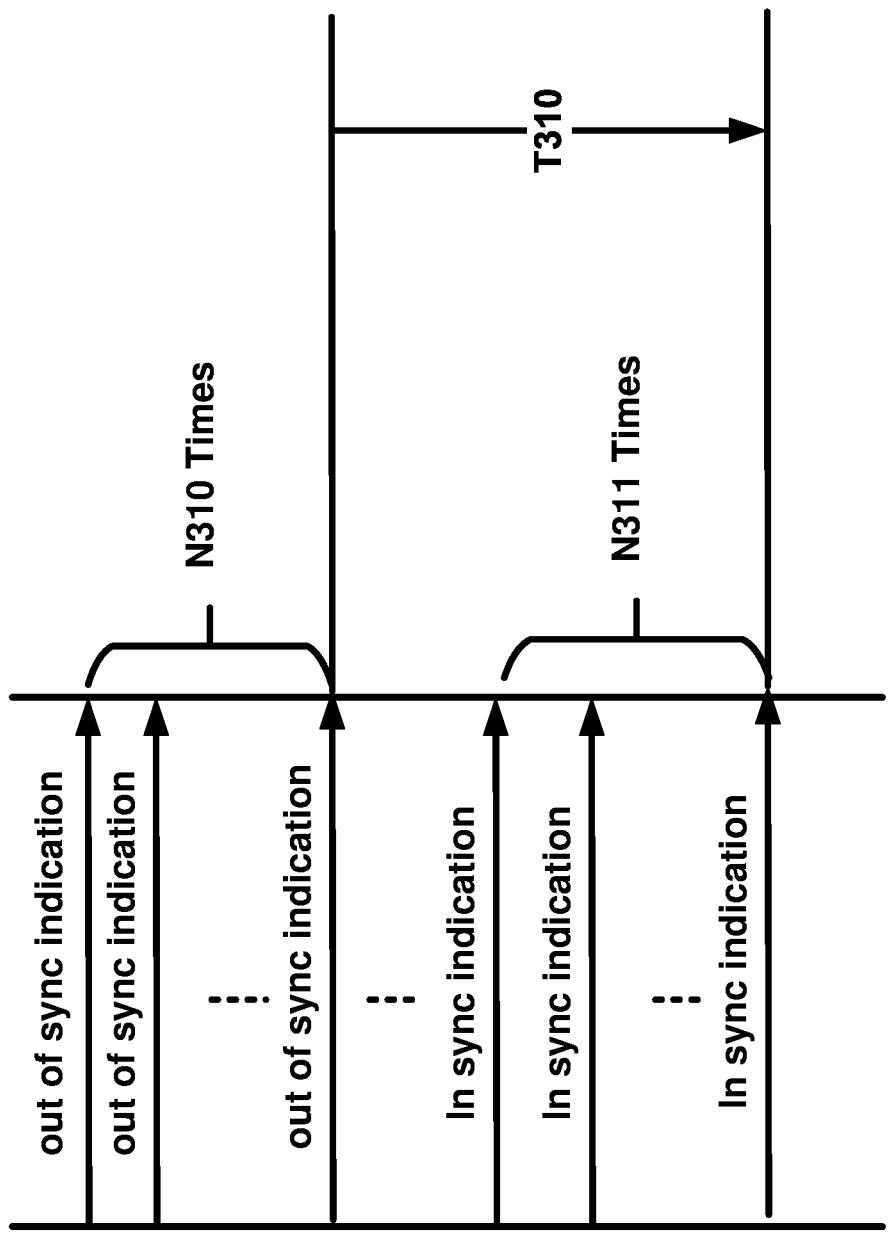
FIG. 13 is an example radio link failure detection process as per an aspect of an embodiment of the present disclosure.

An example procedure for determining if the link has failed due to being out of sync is shown in FIG. 13. In the example Figure, three example parameters may be used:

n310: This parameter may indicate the number of 200 ms intervals when the UE is unable to successfully decode the PDCCH due to low RSRP detected. That is, this parameter may indicate the number of times in which the UE cannot successfully decode 20 consecutive frames in the downlink t310: It is a timer, in seconds, used to allow the UE to get back in synchronization with the eNodeB.

n311: This parameter may indicate the number of 100 ms intervals that the UE successfully decodes the PDCCH to be back in-synch with the eNodeB. That is, this parameter may indicate the number of times in which the UE successfully decodes 10 consecutive frames in the downlink in order for the UE to assume the radio link is in-sync.

In an example, if the UE detects n310 consecutive out-of-sync indications, the UE may start the t310 timer. If the timer expires, the link may be considered failed. If the UE detects n311 consecutive in-sync indications prior to the t310 timer expiring, then the timer may be stopped, and the link may not be considered as failed. In an example, if the UE determines that the Radio Link is failed, the UE may try to reconnect with an RRC Connection Reestablishment Request message. If the RRC connection reestablishment fails, then the session may be dropped.

In an example, the downlink radio link quality of the primary cell may be monitored by the UE to indicate out-of-sync/in-sync status to higher layers. If the UE is configured with a SCG and the parameter rlf-TimersAndConstantsSCG is provided by the higher layers and is not set to release, the downlink radio link quality of the PSCell of the SCG may be monitored by the UE for the purpose of indicating out-of-sync/in-sync status to higher layers.

In an example, in non-DRX mode operation, the physical layer in the UE may every radio frame assess the radio link quality, evaluated over the previous time period defined in, against thresholds ($Q_{out}$ and $Q_{in}$). In an example, in DRX mode operation, the physical layer in the UE may at least once every DRX period assess the radio link quality, evaluated over a previous time period defined, against thresholds ($Q_{out}$ and $Q_{in}$) defined by relevant tests. In an example, if higher-layer signaling indicates certain subframes for restricted radio link monitoring, the radio link quality may not be monitored in any subframe other than those indicated. The physical layer in the UE may, in radio frames where the radio link quality is assessed, indicate out-of-sync to higher layers when the radio link quality is lower than the threshold $Q_{out}$. When the radio link quality is higher than the threshold $Q_{in}$, the physical layer in the UE may in radio frames where the radio link quality is assessed indicate in-sync to higher layers.

In an example, the UE may meet the radio link monitoring requirements specified for PSCell provided that the UE is configured with the parameters T313, N313 and N314. The UE may monitor the downlink link quality based on the cell-specific reference signal in order to detect the downlink radio link quality of the PCell and PSCell. The UE may estimate the downlink radio link quality and compare it to the thresholds $Q_{out}$ and $Q_{in}$ for the purpose of monitoring downlink radio link quality of the PCell and PSCell.

In an example, the threshold $Q_{out}$ may be defined as the level at which the downlink radio link cannot be reliably received and may correspond to 10% block error rate of a hypothetical PDCCH transmission taking into account the PCFICH errors with predefined transmission parameters.

In an example, the threshold $Q_{out}$ may be defined as the level at which the downlink radio link quality may be significantly more reliably received than at $Q_{out}$ and may correspond to 2% block error rate of a hypothetical PDCCH transmission taking into account the PCFICH errors with predefined transmission parameters.

In an example, when higher-layer signaling indicates certain subframes for restricted radio link monitoring, the radio link quality may be monitored.

In an example, when the downlink radio link quality of the PCell or PSCell estimated over the last 200 ms period becomes worse than the threshold $Q_{out}$, Layer 1 of the UE may send an out-of-sync indication for the PCell or PSCell to the higher layers within 200 ms $Q_{out}$ evaluation period. A preconfigured Layer 3 filter may be applied to the out-of-sync indications.

In an example, when the downlink radio link quality of the PCell or PSCell estimated over the last 100 ms period becomes better than the threshold $Q_{in}$, Layer 1 of the UE may send an in-sync indication for the PCell or PSCell to the higher layers within 100 ms $Q_{in}$ evaluation period. A preconfigured L3 filter may be applied to the in-sync indications.

In an example, the out-of-sync and in-sync evaluations of the PCell or PSCell may be performed. Two successive indications from Layer 1 may be separated by at least 10 ms. In an example, the transmitter power of the UE may be turned off within 40 ms after expiry of T310 timer and the transmitter power of PSCell if configured may be turned off within 40 ms after expiry of T313 timer. The UE may not perform LBT procedure on any of FS3 SCell after the expiry of T310. In an example, when DRX is used the $Q_{out}$ evaluation period (e.g., $T_{Evaluate\_Qout\_DRX}$) and the $Q_{in}$ evaluation period (e.g., $T_{Evaluate\_Qin\_DRX}$) may be used. Example values are shown in FIG. 14. In an example, when higher-layer signaling indicates certain subframes for restricted radio link monitoring, the $Q_{out}$ evaluation period (e.g., $T_{Evaluate\_Qout\_DRX}$) and the $Q_{in}$ evaluation period (e.g., $T_{Evaluate\_Qin\_DRX}$) may be used. Example values are shown in FIG. 15. In an example, when eDRX_CONN cycle is used, the $Q_{out}$ evaluation period (e.g., $T_{Evaluate\_Qout\_DRX}$) and the $Q_{in}$ evaluation period (e.g., $T_{Evaluate\_Qin\_DRX}$) may be used. Example values are shown in FIG. 16.

In an example, when the UE creates autonomous gaps for identification the CGI of an E-UTRA intra-frequency cell or an E-UTRA inter-frequency cell and when higher-layer signalling indicates certain subframes for restricted radio link monitoring, the UE may also perform radio link monitoring. In an example, the $Q_{out}$ evaluation period ($T_{Evaluate\_Qout\_DRX}$) and the $Q_{in}$ evaluation period ($T_{Evaluate\_Qin\_DRX}$) may be used. Example, values are shown in FIG. 15.

In an example, when the downlink radio link quality of the PCell or PSCell estimated over the last $T_{Evaluate\_Qout\_DRX}$ [s] period becomes worse than the threshold $Q_{out}$, Layer 1 of the UE may send out-of-sync indication for the PCell or PSCell to the higher layers within $T_{Evaluate\_Qout\_DRX}$ [s] evaluation period. A Layer 3 filter may be applied to the out-of-sync indications.

In an example, when the downlink radio link quality of the PCell or PSCell estimated over the last $T_{Evaluate\_Qin\_DRX}$ [s] period becomes better than the threshold $Q_{in}$, Layer 1 of the UE may send in-sync indications for the PCell or PSCell to the higher layers within $T_{Evaluate\_Qin\_DRX}$ [s] evaluation period. A L3 filter may be applied to the in-sync indications.

In an example, the out-of-sync and in-sync evaluations of the PCell or PSCell may be performed. When DRX is used, two successive indications from Layer 1 may be separated by at least max(10 ms, DRX_cycle_length). In an example, when the UE is configured with dual connectivity, then two successive indications from Layer 1 may be separated by at least max (10 ms, MCG_DRX_cycle_length) for PCell and by at least max(10 ms, SCG_DRX_cycle_length) for PSCell. In an example, when eDRX_CONN is used, two successive indications from Layer 1 may be separated by at least max (10 ms, eDRX_CONN cycle length).

In an example, upon start of T310 timer or T313 timer, the UE may monitor the link of PCell or PSCell for recovery using the evaluation period and Layer 1 indication interval corresponding to the non-DRX mode until the expiry or stop of T310 timer or T313 timer.

In an example, the transmitter power of the UE may be turned off within 40 ms after expiry of T310 timer and the transmitter power of PSCell if configured may be turned off within 40 ms after expiry of T313 timer. The UE may not perform LBT procedure on any of FS3 SCells after the expiry of T310.

In an example, upon receiving N313 consecutive out-of-sync indications for PSCell from lower layers while T307 is not running, the UE may start he T313 timer. In an example, upon receiving N314 consecutive in-sync indications from the PSCell from lower layers while T313 timer is running, the UE may stop the T313 timer. In an example, periods of time where neither in-sync nor out-of-sync is reported by layer 1 may not affect the evaluation of the number of in-sync or out-of-sync indications.

In an example, upon T313 expiry, or upon random access problem indication from SCG MAC or upon indication from SCG RLC that the maximum number of retransmissions has been reached for an SCG or split DRB, the UE may consider radio link failure to be detected for the SCG (e.g. SCG-RLF). In an example, the UE may initiate an SCG failure information procedure. In an example, the UE may discard the radio link failure information, e.g. release the UE variable VarRLF-Report, 48 hours after the radio link failure is detected, upon power off or upon detach.

Figure 17:
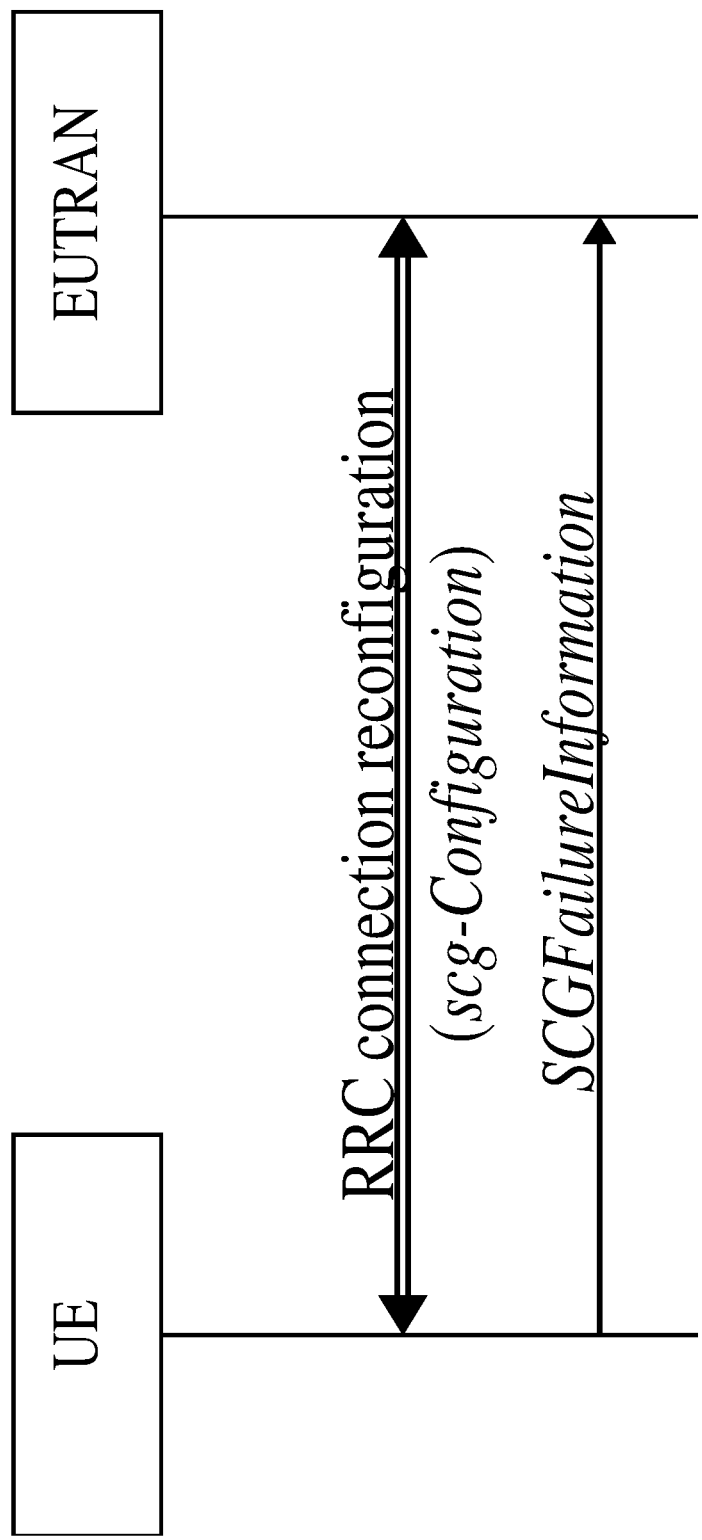
FIG. 17 shows example SCG failure information reporting procedure as per an aspect of an embodiment of the present disclosure.

In an example, the purpose of SCG failure information procedure may be to inform the network about an SCG failure the UE has experienced e.g. SCG radio link failure, SCG change failure. An example is shown in FIG. 17. In an example, a UE may initiate the procedure to report SCG failures when SCG transmission is not suspended and when at least one of the following conditions is met: upon detecting radio link failure for the SCG; or upon SCG change failure, or upon stopping uplink transmission towards the PSCell due to exceeding the maximum uplink transmission timing difference when powerControlMode is configured to 1.

In an example, upon initiating the procedure, the UE may suspend all SCG DRBs and suspend SCG transmission for split DRBs; reset SCG-MAC; stop T307; and initiate transmission of the SCGFailureInformation message. In an example, if the UE initiates transmission of the SCGFailureInformation message to provide SCG radio link failure information, the UE may include failureType in the SCGFailureInformation message and set it to the trigger for detecting SCG radio link failure. In an example, the measured qualities may be filtered by the L3 filter as configured in the mobility measurement configuration. The measurements may be based on the time domain measurement resource restriction, if configured. In an example, blacklisted cells may not be required to be reported.

In an example embodiment, additional failure types may be added for LAA cells, e.g. to indicate information about the LBT failures, or other specific RLF parameters related to LAA cells and LBT.

In an example embodiment, a UE may be configured with dual, connectivity where the SPCell is configured in an unlicensed band. Example embodiments may be used for radio link monitoring of LAA SPcells and may also apply to RLM on standalone unlicensed cells.

In an example embodiment, the UE may be configured with radio link monitoring parameters such as T313, N313 and N314 similar to those used for licensed carriers. In an example the UE may apply such parameters to meet the radio link monitoring requirements on LAA SPcells or standalone unlicensed PCells. In an example the UE may estimate the downlink radio link quality same way a licensed carrier and compare it to the thresholds $Q_{out}$ and $Q_{in}$ for the purpose of monitoring downlink radio link quality of the unlicensed/LAA PSCell. If the UE detects n313 consecutive out-of-sync indications, it starts the t313 timer. If the timer expires, the link has failed. If the UE detects n314 consecutive in-sync indications prior to the t313 timer expiring, then the timer is stopped and the link has not failed. If the UE determines that the Radio Link fails, the UE may try to reconnect with an RRC Connection Reestablishment Request message.

In an example, in licensed cells, when the downlink radio link quality of the PCell or PSCell estimated over the last 200 (as an example) ms period becomes worse than the threshold $Q_{out}$, Layer 1 of the UE may send an out-of-sync indication for the PCell or PSCell to the higher layers within 200 ms (as an example) $Q_{out}$ evaluation period. A preconfigured Layer 3 filter may be applied to the out-of-sync indications. Two successive indications from Layer 1 may be separated by at least 10 ms.

In example the conditions for two successive indication from Layer 1 or period of time over which downlink quality of LAA SPCells are estimated for $Q_{out}$ indication may be different than that used for licensed SPCell and PCell. In example the period of time for estimation of $Q_{out}$ may be expanded, e.g. to 500 msec (as an example). In another example the two successive out-of-synch indications from Layer 1 may be separated by at least 20 ms (as an example).

In an example, when RLF on LAA SPCell is detected based on T313 expiry the UE may initiate SCG-RLF procedure similar to licensed cells and send the SCGFailureInformation with failureType is set to t313-Expiry.

Figure 18:
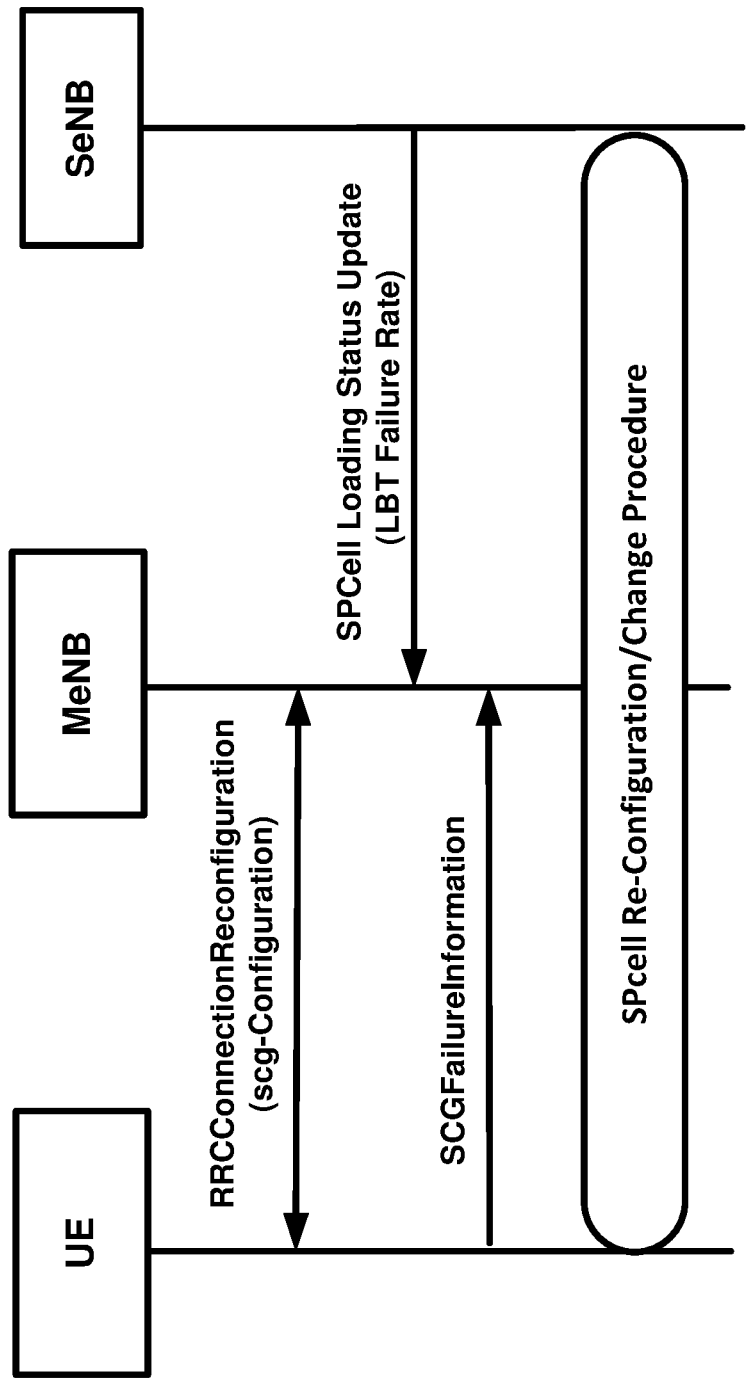
FIG. 18 shows example SPCell reconfiguration procedure as per an aspect of an embodiment of the present disclosure.

In an example, the SeNB provide MeNB through X2 signalling on loading status on SPcell including information on rate of LBT failures, e.g. percentage of downlink subframes blocked by LBT failure in the last N subframe. Where N may be configurable, e.g. by RRC signalling. In an example, an SeNB may include the number of missed DRS transmission due to LBT as a measure of excessive loading in downlink. In an example, MeNB may consider this information along with SCGFailureInformation from a UE determine if the RLF indication by UE was due to excessive LBT failure of SeNB or radio condition on SPcell meeting certain criteria, before triggering SPCell Change or other mitigation. An example is shown in FIG. 18.

Excessive LBT failure may be measured by the number of unsuccessful LBT attempts e.g. over a period of time/subframes, radio of unsuccessful LBT over successful LBT attempts, the value of LBT counters/windows, and other LBT parameters. When one or more LBT statistics meets certain criteria, excessive LBT failure may be indicated.

Figure 19:
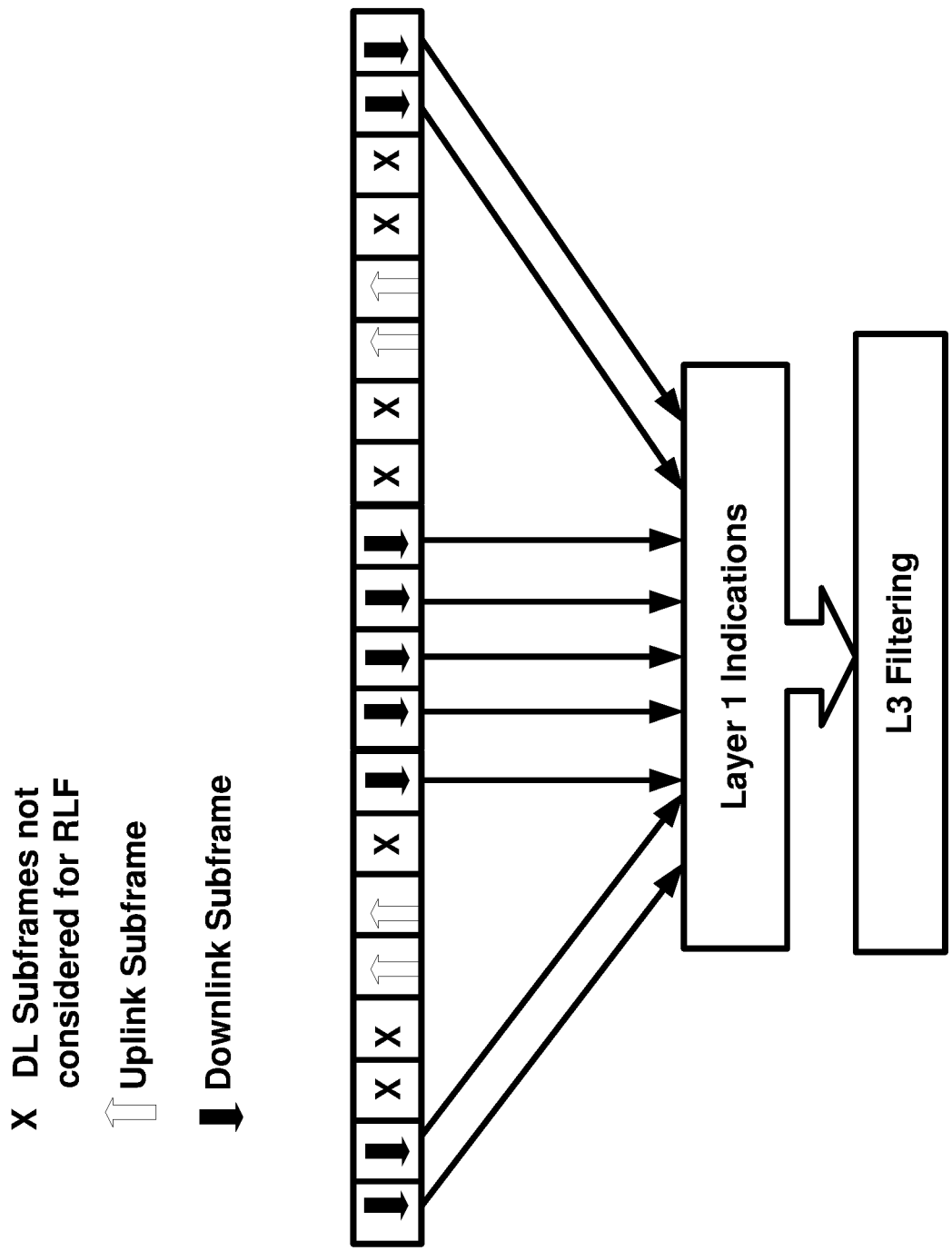
FIG. 19 shows example radio link failure detection procedure as per an aspect of an embodiment of the present disclosure.

In an example embodiment, the radio link monitoring of downlink by UE measurement for determining RLF for LAA SPCells may take into account the possibility of no transmission on some subframes by SeNB, for example due to LBT, e.g., unsuccessful LBT due to channel being occupied. An example procedure is shown in FIG. 19. In example, an eNB may configure a UE with a maximum no transmit SPCell signal threshold $T_{NoTX}$. In an example the $T_{NoTX}$ threshold may be set via RRC signalling at a lower value than $Q_{out}$ threshold used for out-of-synch determination. If UE received a signal below $T_{NoTX}$ (or when a UE does not detect reference signals or other signals) it may assume there no transmission on SPCell (or PCell). In example embodiment, the UE may exclude subframes for which no SPCell transmission by SeNB is detected, e.g. no data or missing DRS transmissions in DL, and those which are indicated as uplink subframes, in generating out of synch indications toward N313 counter. UE may also assume no downlink transmission for on subframes beyond maximum channel occupancy of SPcell. In example, UE may apply such exclusions in it L3 filtering of measurements similar to subframe measurement restriction without prior knowledge or configuration of restricted subframes by MeNB. In an example the UE may generate SCGFailureInformation upon T313 expiry and MeNB may take such information as well as any information about LBT failures provided by SeNB, if available, into account in initiating SPCell Change or other mitigation procedures.

Figure 20:
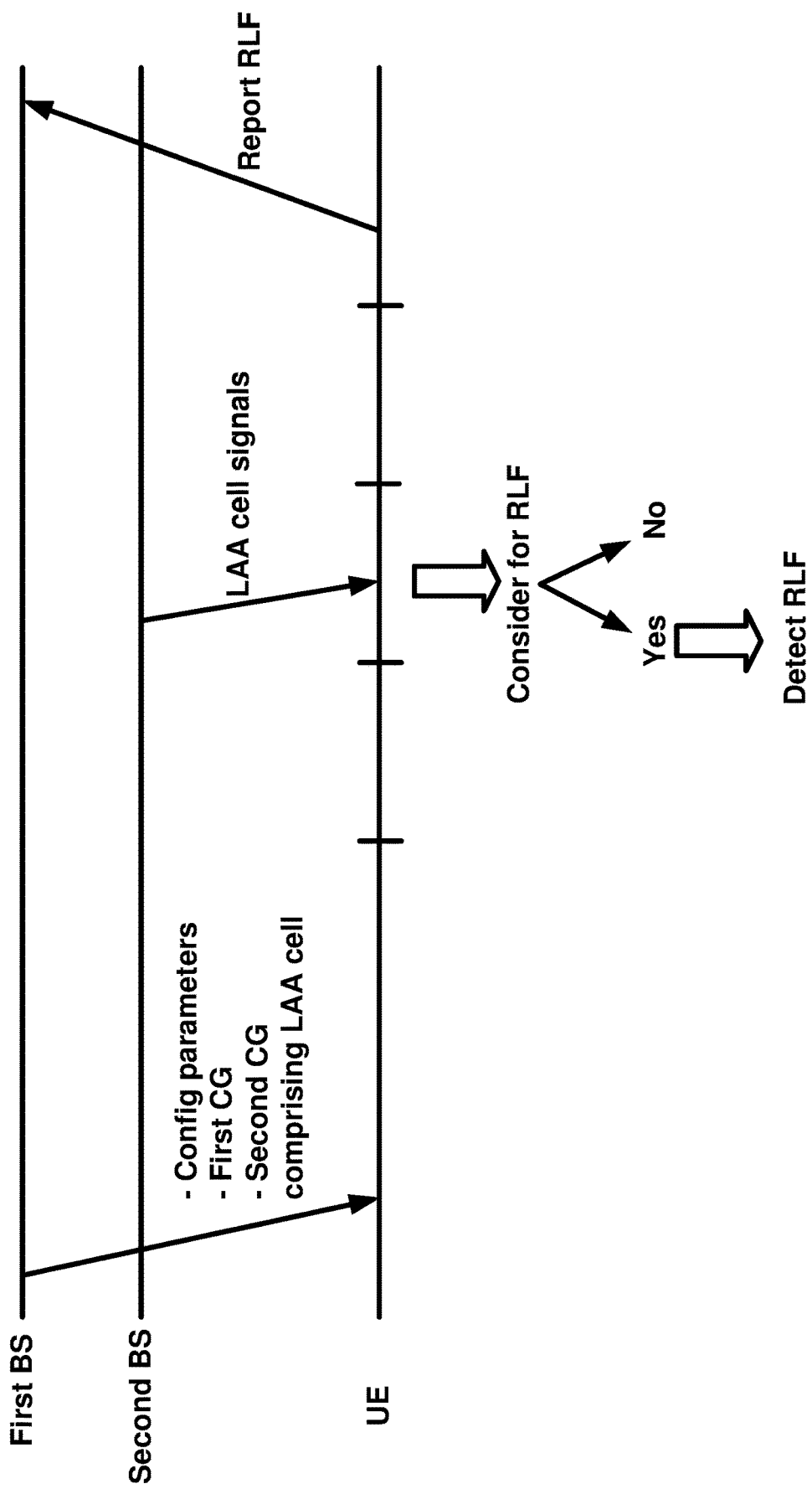
FIG. 20 shows example radio link failure detection procedure as per an aspect of an embodiment of the present disclosure.

In an example embodiment, a wireless device may receive from a first base station (e.g., an MeNB) configuration parameters of a plurality of cells. The plurality of cells may be grouped into a first cell group (e.g., MCG) for communication with the first base station and a second cell group (e.g., SCG) for communication with the second base station (e.g., SeNB). In an example, the second cell group may comprise an LAA cell. An example RLF detection procedure is shown in FIG. 20. The wireless device may receive LAA cell signals from the second base station in a subframe of a plurality of subframes of the LAA cell. In an example the LAA cell signals may comprise one or more reference signals. In an example, the LAA cell signals may comprise PCFICH. The wireless device may process the LAA cell signals in a subframe and determine whether the subframe is considered for RLF detection or not. In an example, the wireless device may determine that the subframe is not considered for RLF detection if the LAA cell signals do not comprise PCFICH. In an example, the wireless device may determine that the subframe is not considered for RLF detection in response to the RSRP being below a threshold. The wireless may increment a counter in response to the subframe of the LAA cell being considered for RLF detection and the wireless device not successfully decoding a control channel (e.g. PDCCH) in the subframe of the LAA cell. The wireless device may detect a radio link failure based on the counter. The wireless device may transmit a first message indicating radio link failure to the first base station.

Figure 21:
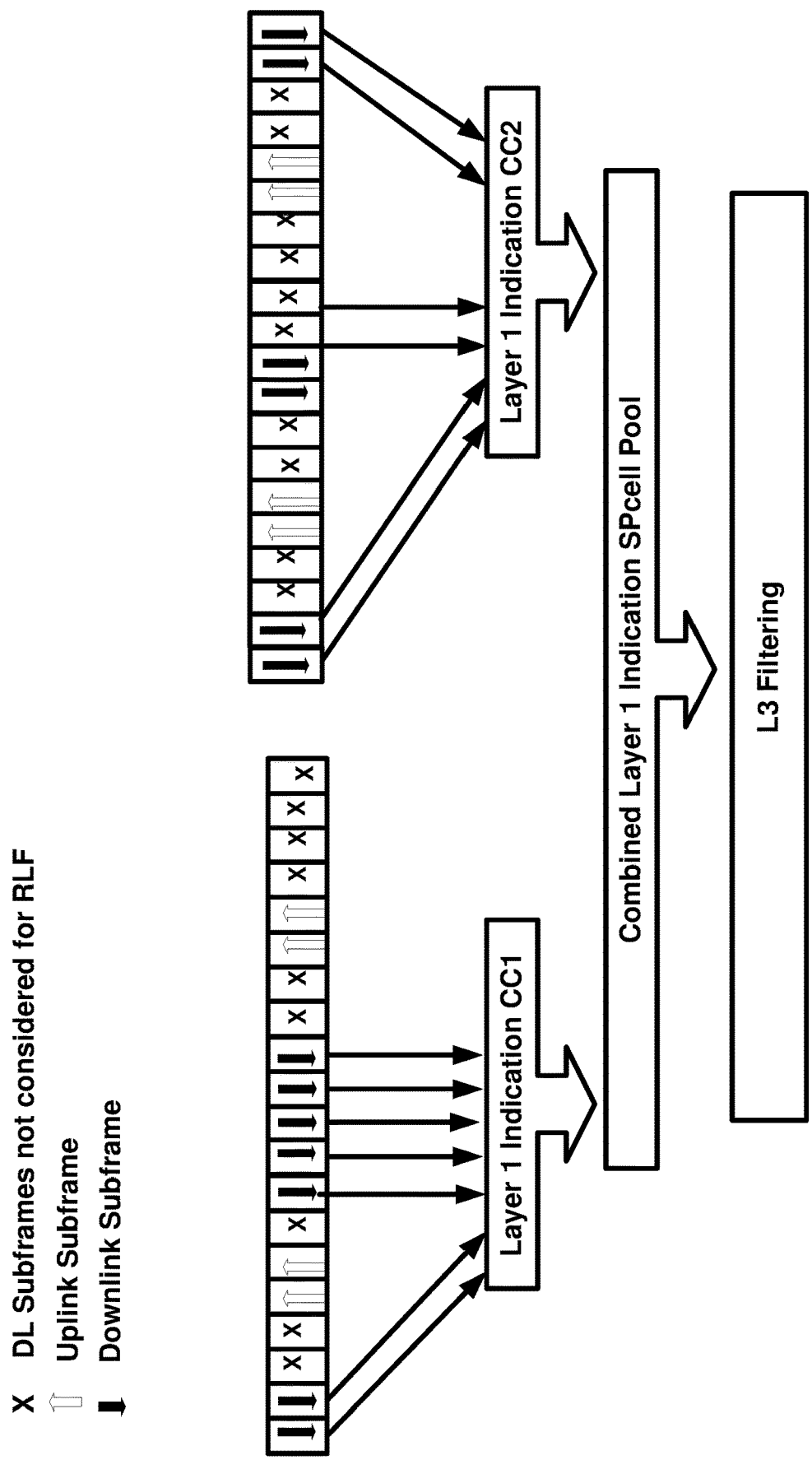
FIG. 21 shows example radio link failure detection procedure as per an aspect of an embodiment of the present disclosure.

In an example embodiment, a UE in dual connectivity may be configured with a pool of LAA SPCells on SeNB. In example embodiment a UE may perform radio link measurement and monitoring of one or more collocated Cells within an RRC configured SPcell pool to determine the radio link failure on SeNB. An example is shown in FIG. 21. In an example, a UE may trigger Layer 1 indication of out-of-synch for SPCell pool if it detects at layer 1 out-of-synch for all cells within the SPCell pool and indicates layer 1 in-synch for SPcell pool if it detects layer 1 in-synch for one or more of cells in SPCell pool. In an example the in-sync and out-of-sync counters and timers may be individually tracked for a cell in the SPcell pool. In an example embodiment, UE may track one in-sync counter/timer and one out-of-sync counter/timer for entire SPCell Pool. The N313 may be incremented if out-of-sync is detected for cells in SPCell pool and N314 is incremented if in-sync condition is met for either of cells in SPcell pool.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 22:
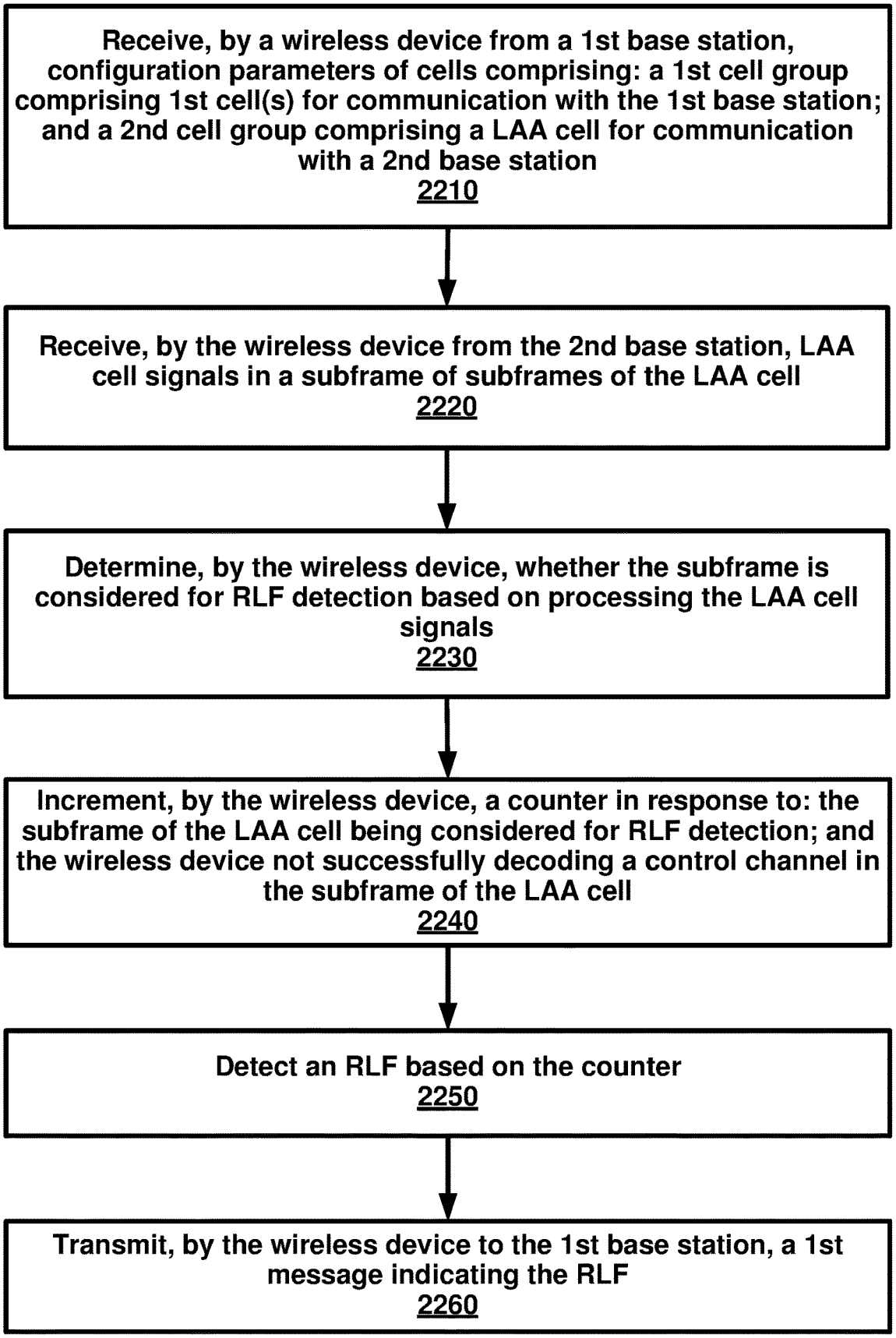
FIG. 22 is an example flow diagram as per an aspect of an embodiment of the present disclosure.

FIG. 22 is an example flow diagram as per an aspect of an embodiment of the present disclosure. At 2210, a wireless device may receive from a first base station, configuration parameters of a plurality of cells. Configuration parameters of a plurality of cells may comprise a first cell group comprising one or more first cells for communication with the first base station, and a second cell group comprising a licensed assisted access (LAA) cell for communication with a second base station.

At 2220, the wireless device may receive from the second base station LAA cell signals in a subframe of a plurality of subframes of the LAA cell. At 2230, the wireless device may determine whether the subframe is considered for radio link failure (RLF) detection based on processing the LAA cell signals.

At 2240, the wireless device may increment a counter in response to the subframe of the LAA cell being considered for RLF detection, and the wireless device not successfully decoding a control channel in the subframe of the LAA cell. At 2250, the wireless device may detect an RLF based on the counter. At 2260, the wireless device may transmit to the first base station, a first message indicating the RLF.

According to an embodiment, the wireless device may further start a timer in response to the counter reaching a first number. According to an embodiment, the configuration parameters may comprise the first number. According to an embodiment, the wireless device may detect the RLF in response to the timer expiring, and the wireless device not successfully decoding a control channel for a second number of times while the timer is running According to an embodiment, the configuration parameters may comprise a first parameter indicating a timer value for the timer, and a second parameter indicating the second number. According to an embodiment, the wireless device may further transmit to the first base station a radio resource control connection reestablishment request message. According to an embodiment, the wireless device may release one or more uplink transmission configurations.

According to an embodiment, the successfully decoding of the control channel may be based on a reference signal received power. According to an embodiment, the LAA cell may be a primary secondary cell. According to an embodiment, the LAA cell signals may comprise one or more reference signals.

Figure 23:
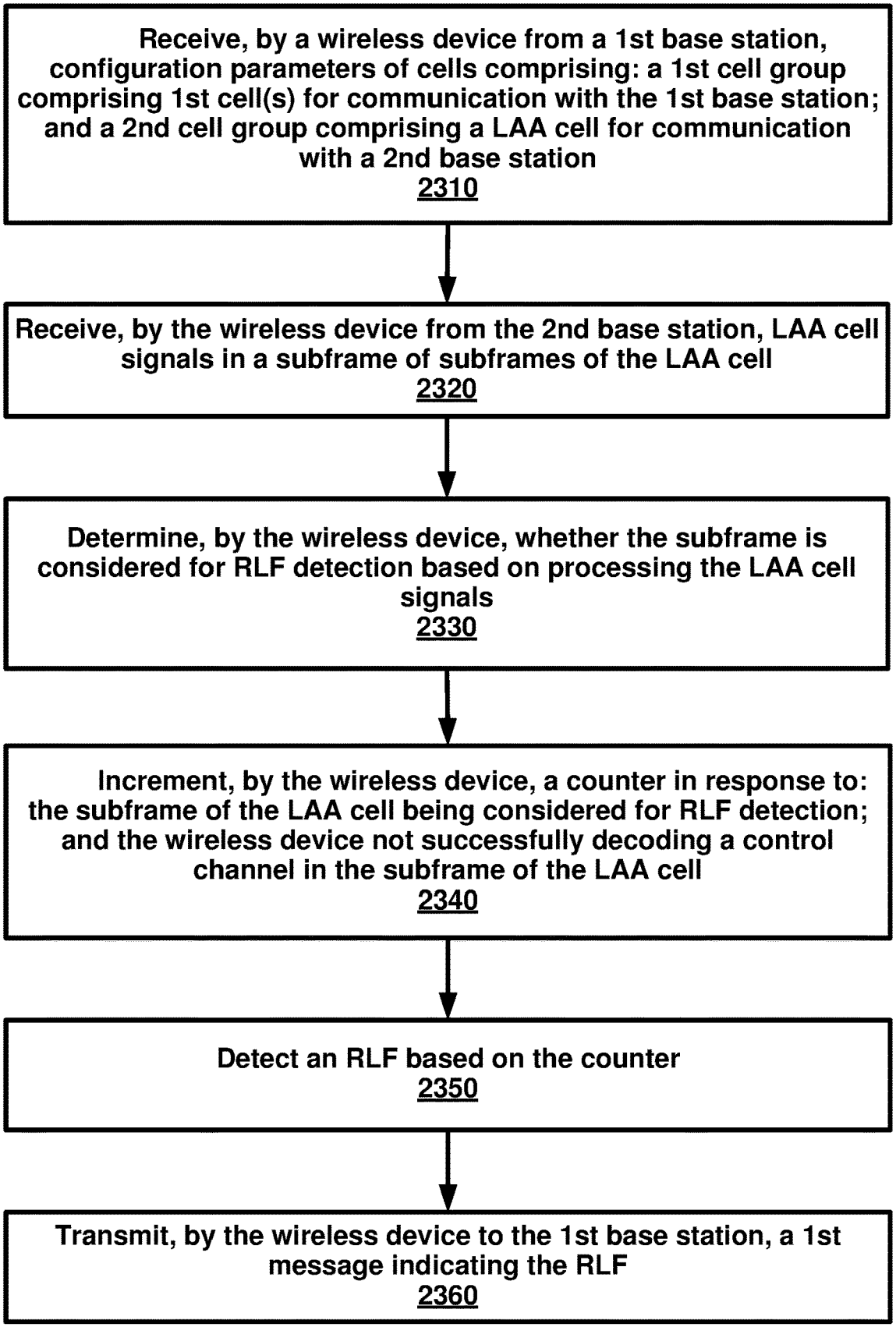
FIG. 23 is an example flow diagram as per an aspect of an embodiment of the present disclosure.

FIG. 23 is an example flow diagram as per an aspect of an embodiment of the present disclosure. At 2310, a wireless device may receive from a first base station, configuration parameters of a plurality of cells. Configuration parameters of a plurality of cells may comprise a first cell group comprising one or more first cells for communication with the first base station, and a second cell group comprising a licensed assisted access (LAA) cell for communication with a second base station.

At 2320, the wireless device may receive from the second base station LAA cell signals in a subframe of a plurality of subframes of the LAA cell. At 2330, the wireless device may determine whether the subframe is considered for radio link failure (RLF) detection based on processing the LAA cell signals.

At 2340, the wireless device may increment a counter in response to the subframe of the LAA cell being considered for RLF detection, and the wireless device not successfully decoding a control channel in the subframe of the LAA cell. At 2350, the wireless device may detect an RLF based on the counter. At 2360, the wireless device may transmit to the first base station, a first message indicating the RLF.

According to an embodiment, the wireless device may further start a timer in response to the counter reaching a first number. According to an embodiment, the configuration parameters may comprise the first number. According to an embodiment, the wireless device may detect the RLF in response to the timer expiring, and the wireless device not successfully decoding a control channel for a second number of times while the timer is running According to an embodiment, the configuration parameters may comprise a first parameter indicating a timer value for the timer, and a second parameter indicating the second number. According to an embodiment, the wireless device may further transmit to the first base station a radio resource control connection reestablishment request message. According to an embodiment, the wireless device may release one or more uplink transmission configurations.

According to an embodiment, the successfully decoding of the control channel may be based on a reference signal received power. According to an embodiment, the LAA cell may be a primary secondary cell. According to an embodiment, the LAA cell signals may comprise one or more reference signals.

Figure 24:
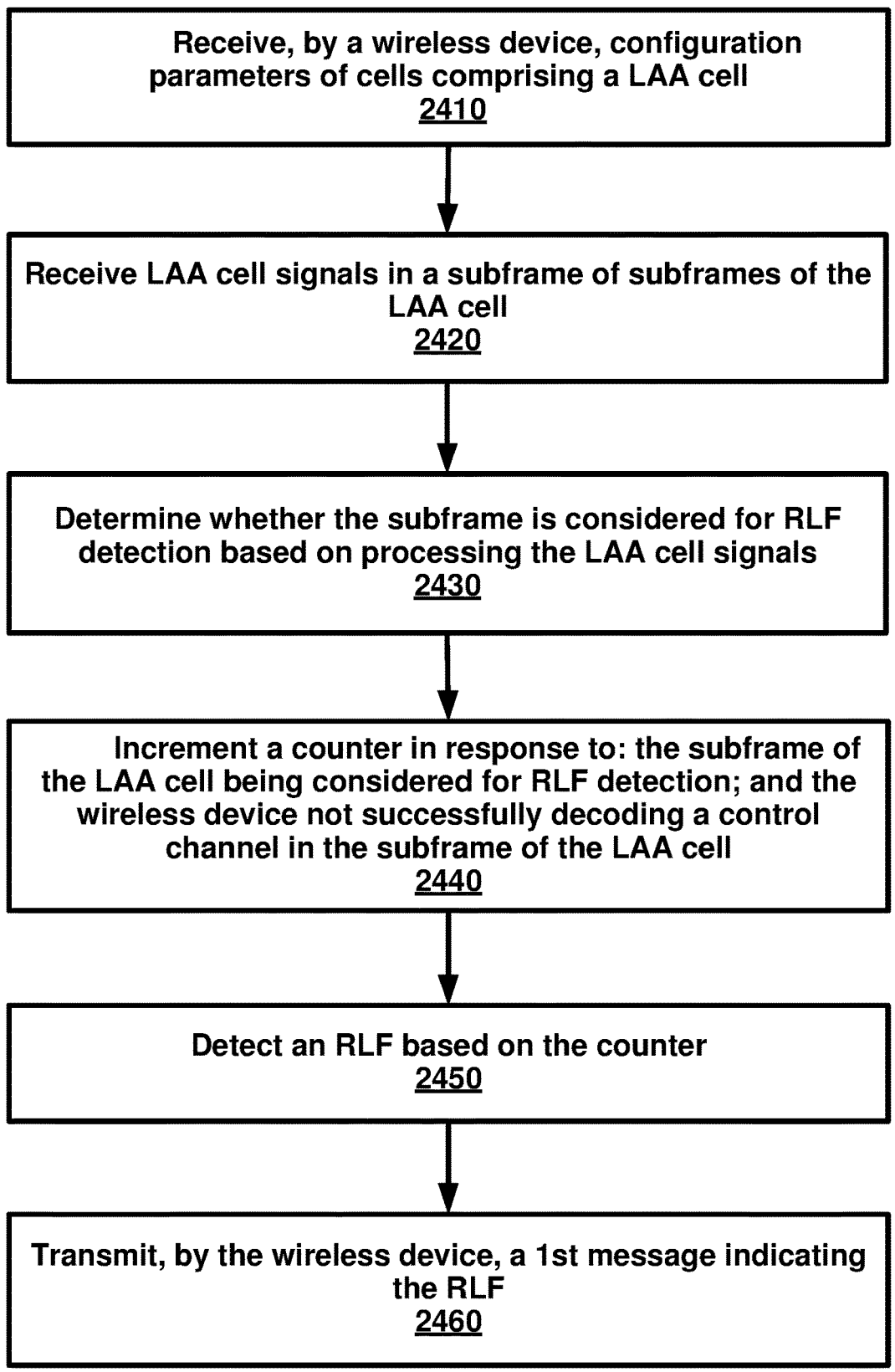
FIG. 24 is an example flow diagram as per an aspect of an embodiment of the present disclosure.

FIG. 24 is an example flow diagram as per an aspect of an embodiment of the present disclosure. At 2410, a wireless device may receive from a first base station, configuration parameters of a plurality of cells. Configuration parameters may comprise a licensed assisted access (LAA) cell. At 2420, the wireless device may receive LAA cell signals in a subframe of a plurality of subframes of the LAA cell. At 2430, the wireless device may determine whether the subframe is considered for radio link failure (RLF) detection based on processing the LAA cell signals.

At 2440, the wireless device may increment a counter in response to the subframe of the LAA cell being considered for RLF detection, and the wireless device not successfully decoding a control channel in the subframe of the LAA cell. At 2450, the wireless device may detect an RLF based on the counter. At 2460, the wireless device may transmit to the first base station, a first message indicating the RLF.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" is indicative that the phrase following the term "based on" is an example of one of a multitude of suitable possibilities that may, or may not, be employed to one or more of the various embodiments. The phrase "in response to" is indicative that the phrase following the phrase "in response to" is an example of one of a multitude of suitable possibilities that may, or may not, be employed to one or more of the various embodiments.

In this disclosure, various embodiments are disclosed. Limitations, features, and/or elements from the disclosed example embodiments may be combined to create further embodiments within the scope of the disclosure.

In this disclosure, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, MATLAB or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers, and microprocessors are programmed using languages such as assembly, C, C++, or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above-mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using LAA communication systems. However, one skilled in the art will recognize that embodiments of the disclosure may also be implemented in a system comprising one or more TDD cells (e.g. frame structure 2 and/or frame structure 1). The disclosed methods and systems may be implemented in wireless or wireline systems. The features of various embodiments presented in this disclosure may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. A method comprising:
 receiving, by a wireless device, configuration parameters of an unlicensed cell;
 receiving, by the wireless device and via the unlicensed cell, downlink signals during a time window comprising a plurality of downlink transmission time intervals;
 determining, by the wireless device, whether the time window is used for radio link failure (RLF) detection of the unlicensed cell;
 incrementing, by the wireless device, a counter in response to:
  a radio link quality of the downlink signals being worse than a threshold during the time window; and
  the time window being used for the RLF detection of the unlicensed cell;
 detecting an RLF based on the counter; and
 transmitting, by the wireless device, a first message indicating the RLF.

2. The method of claim 1, further comprising starting, by the wireless device, a timer in response to the counter reaching a first number.

3. The method of claim 2, wherein the configuration parameters indicate the first number.

4. The method of claim 2, wherein detecting the RLF is in response to:
the timer expiring; and
a radio link quality of the downlink signals being worse than a threshold for a second number of times while the timer is running.

5. The method of claim 4, wherein the configuration parameters comprise:
a first parameter indicating a timer value for the timer; and
a second parameter indicating the second number.

6. The method of claim 1, further comprising transmitting, by the wireless device to a base station, a radio resource control connection reestablishment request message.

7. The method of claim 6, wherein the radio resource control connection reestablishment request message comprises the first message.

8. The method of claim 1, further comprising releasing one or more uplink transmission configurations.

9. The method of claim 1, wherein the unlicensed cell is a primary secondary cell.

10. The method of claim 1, wherein the configuration parameters comprise a parameter indicating a value for the threshold.

11. A wireless device comprising:
one or more processors; and
memory storing instructions that, when executed by the one or more processors, cause the wireless device to:
receive configuration parameters of an unlicensed cell;
receive, via the unlicensed cell, downlink signals during a time window comprising a plurality of downlink transmission time intervals;
determine whether the time window is used for radio link failure (RLF) detection of the unlicensed cell;
increment a counter in response to:
a radio link quality of the downlink signals being worse than a threshold during the time window; and
the time window being used for the RLF detection of the unlicensed cell;
detect an RLF based on the counter; and
transmit a first message indicating the RLF.

12. The wireless device of claim 11, wherein the instructions, when executed by the one or more processors, further cause the wireless device to start a timer in response to the counter reaching a first number.

13. The wireless device of claim 12, wherein the configuration parameters indicate the first number.

14. The wireless device of claim 12, wherein the RLF is detected in response to:
the timer expiring; and
a radio link quality of the downlink signals being worse than a threshold for a second number of times while the timer is running.

15. The wireless device of claim 14, wherein the configuration parameters comprise:
a first parameter indicating a timer value for the timer; and
a second parameter indicating the second number.

16. The wireless device of claim 11, wherein the instructions, when executed by the one or more processors, further cause the wireless device to transmit, to a base station, a radio resource control connection reestablishment request message.

17. The wireless device of claim 16, wherein the radio resource control connection reestablishment request message comprises the first message.

18. The wireless device of claim 11, wherein the instructions, when executed by the one or more processors, further cause the wireless device to release one or more uplink transmission configurations.

19. The wireless device of claim 11, wherein the unlicensed cell is a primary secondary cell.

20. A system comprising:
a wireless device comprising:
one or more first processors; and
a first memory storing instructions that, when executed by the one or more first processors, cause the wireless device to:
receive configuration parameters of an unlicensed cell;
receive, via the unlicensed cell, downlink signals during a time window comprising a plurality of downlink transmission time intervals;
determine whether the time window is used for radio link failure (RLF) detection of the unlicensed cell;
increment a counter in response to:
a radio link quality of the downlink signals being worse than a threshold during the time window; and
the time window being used for the RLF detection of the unlicensed cell;
detect an RLF based on the counter; and
transmit a first message indicating the RL;
a base station comprising:
one or more second processors; and
a second memory storing instructions that, when executed by the one or more second processors, cause the base station to:
transmit the configuration parameters of the unlicensed cell; and
transmit, via the unlicensed cell, the downlink signals during the time window comprising the plurality of downlink transmission time intervals.

* * * * *

UNITED STATES PATENT AND TRADEMARK OFFICE
CERTIFICATE OF CORRECTION

PATENT NO. : 11,109,304 B2  
APPLICATION NO. : 16/686368  
DATED : August 31, 2021  
INVENTOR(S) : Dinan Page 1 of 1

It is certified that error appears in the above-identified patent and that said Letters Patent is hereby corrected as shown below:

In the Claims

In Column 30, Line 43, replace "transmit a first message indicating the RL" with --transmit a first message indicating the RLF--

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*